United States Patent
Ito et al.

(10) Patent No.: US 9,030,448 B2
(45) Date of Patent: May 12, 2015

(54) INFORMATION STORAGE MEDIUM AND IMAGE CONTROL SYSTEM FOR MULTI-TOUCH RESISTIVE TOUCH PANEL DISPLAY

(75) Inventors: Maya Ito, Tokyo (JP); Masanobu Suzui, Musashino (JP)

(73) Assignee: BANDAI NAMCO Games Inc., Tokyo (JP)

( * ) Notice: Subject to any disclaimer, the term of this patent is extended or adjusted under 35 U.S.C. 154(b) by 913 days.

(21) Appl. No.: 12/884,789

(22) Filed: Sep. 17, 2010

(65) Prior Publication Data

US 2011/0069040 A1  Mar. 24, 2011

(30) Foreign Application Priority Data

Sep. 18, 2009  (JP) ................................ 2009-218083

(51) Int. Cl.
| | |
|---|---|
| *G06F 3/041* | (2006.01) |
| *G06F 3/045* | (2006.01) |
| *G06F 3/0484* | (2013.01) |
| *G06F 3/0488* | (2013.01) |

(52) U.S. Cl.
CPC ............. *G06F 3/0418* (2013.01); *G06F 3/045* (2013.01); *G06F 3/04886* (2013.01); *A63F 2300/301* (2013.01); *A63F 2300/1075* (2013.01);
(Continued)

(58) Field of Classification Search
CPC ......... G06F 3/041; G06F 3/045; G06F 3/033; G06F 3/03547; G06F 3/048; G06F 3/0487; G06F 3/0488; G06F 3/04883; G06F 3/04886; G06F 2203/04808; A63F 13/00; A63F 13/005; A63F 13/06; A63F 2300/00; A63F 2300/10; A63F 2300/1006; A63F 2300/1068; A63F 2300/1075; A63F 2300/30; A63F 2300/301

USPC ........... 345/156, 173–177; 463/4, 30, 36, 37, 463/43, 31; 715/863, 864, 830; 178/18.01–18.11
See application file for complete search history.

(56) References Cited

U.S. PATENT DOCUMENTS

| | | | |
|---|---|---|---|
| 6,958,749 B1 | 10/2005 | Matsushita et al. | |
| 7,708,641 B2 * | 5/2010 | Tawara | ........................... 463/31 |
| 7,907,125 B2 * | 3/2011 | Weiss et al. | ................... 345/173 |

(Continued)

FOREIGN PATENT DOCUMENTS

| | | |
|---|---|---|
| JP | A-2001-134382 | 5/2001 |
| JP | A-2006-136638 | 6/2006 |

*Primary Examiner* — Ariel Balaoing
*Assistant Examiner* — Darlene M Ritchie
(74) *Attorney, Agent, or Firm* — Posz Law Group, PLC

(57) ABSTRACT

An image control system controls an image displayed on a display screen of a display section based on a detection value output from a detection section, the detection section outputting the detection value corresponding to a first position when an operation state of a touch operation performed on an operation surface is a first operation state in which a first touch operation is performed at the first position on the operation surface, and outputting the detection value corresponding to a midpoint between the first position and a second position when the operation state is a second operation state in which a second touch operation is performed at the second position on the operation surface in addition to the first touch operation. The image control system includes a correction section that calculates a corrected position when the operation state is the second operation state, one endpoint being indicated by a detected position acquired in the first operation state, a midpoint being indicated by a detected position acquired in the second operation state, and the other endpoint being indicated by the corrected position.

26 Claims, 14 Drawing Sheets

(52) U.S. Cl.
CPC .... *G06F2203/04808* (2013.01); *G06F 3/0484* (2013.01); *G06F 3/0488* (2013.01)

(56) References Cited

U.S. PATENT DOCUMENTS

| | | | |
|---|---|---|---|
| 8,239,784 B2* | 8/2012 | Hotelling et al. | 715/830 |
| 8,345,019 B2* | 1/2013 | D'Souza et al. | 345/174 |
| 8,445,793 B2* | 5/2013 | Westerman et al. | 178/18.03 |
| 8,477,107 B2* | 7/2013 | Chiang | 345/173 |
| 8,717,323 B2* | 5/2014 | Kukulski | 345/173 |
| 2005/0046621 A1* | 3/2005 | Kaikuranta | 345/173 |
| 2006/0025218 A1* | 2/2006 | Hotta | 463/37 |
| 2006/0026536 A1* | 2/2006 | Hotelling et al. | 715/863 |
| 2006/0139340 A1* | 6/2006 | Geaghan | 345/177 |
| 2009/0207140 A1* | 8/2009 | Hansson | 345/173 |

\* cited by examiner

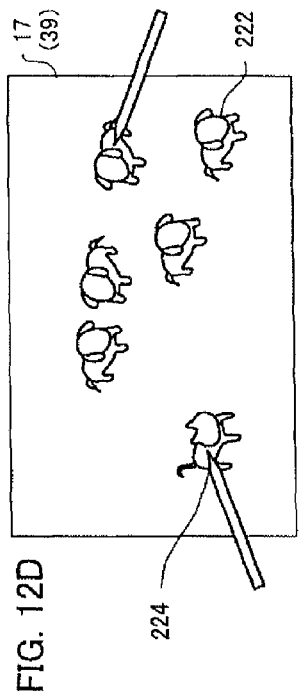
FIG. 12A
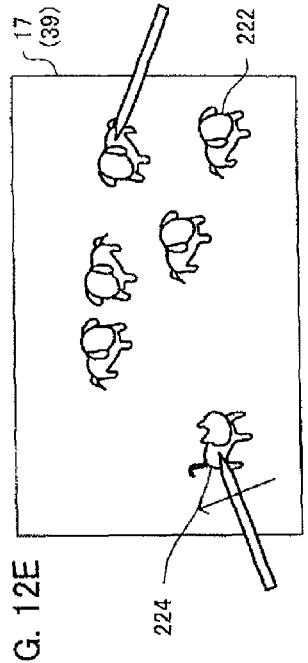
FIG. 12B
FIG. 12C
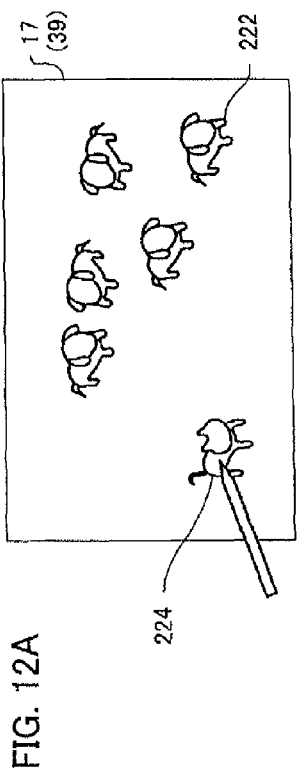
FIG. 12D
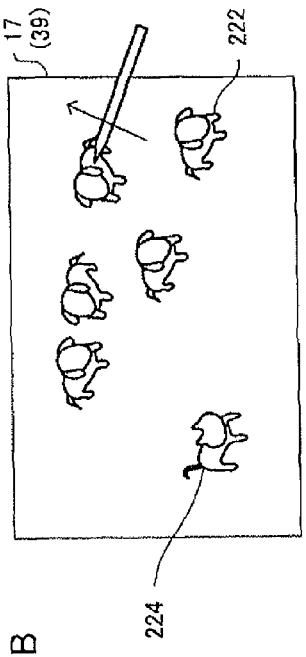
FIG. 12E
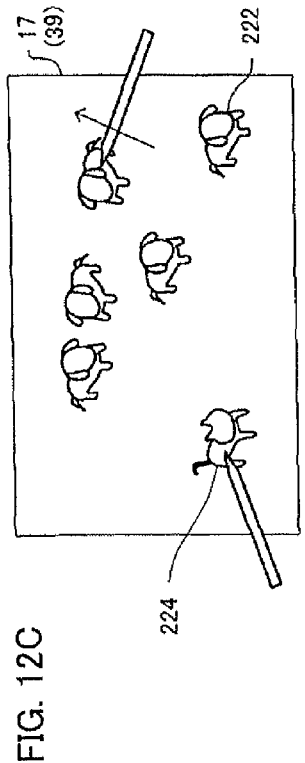

INFORMATION STORAGE MEDIUM AND IMAGE CONTROL SYSTEM FOR MULTI-TOUCH RESISTIVE TOUCH PANEL DISPLAY

Japanese Patent Application No. 2009-218083 filed on Sep. 18, 2009, is hereby incorporated by reference in its entirety.

BACKGROUND OF THE INVENTION

The present invention relates to an information storage medium and an image control system.

An image control system (image control device) including a touch panel has been known. When the operator has performed a touch operation on an operation surface with the fingertip, an indicator, or the like, a detection value corresponding to the position of the touch operation is output. An image control system including a touch panel may acquire the position coordinates on the operation surface based on the detection value from the touch panel, and control the image based on the position coordinates.

A touch panel may output a detection value corresponding to one position when the touch operation has been performed at one position on the operation surface, and output a detection value corresponding to the midpoint between two positions when the touch operation has been performed at two positions on the operation surface. Specifically, an image control system including such a touch panel acquires the position coordinates of the touch operation when the touch operation has been performed at one position on the operation surface, and controls the image based on the position of the touch operation. However, when the touch operation has been performed at two positions, the image control system acquires the position coordinates of a position differing from the position of the touch operation. Therefore, the image control system cannot control the image based on the position of the touch operation. In order to deal with such a problem, an image control system that determines that the touch operation has been performed at two positions when a large change in position coordinates has occurred, and displays an alert message, or disregards the touch operation, has been proposed (see JP-A-2006-136638).

Specifically, a related-art image control system using the above touch panel does not perform a process based on the acquired position coordinates when the touch operation has been performed at two positions.

SUMMARY

According to a first aspect of the invention, there is provided a program stored in a non-transitory computer-readable information storage medium, the program controlling an image displayed on a display screen of a display section based on a detection value output from a detection section, the detection section outputting the detection value corresponding to a first position when an operation state of a touch operation performed on an operation surface is a first operation state in which a first touch operation is performed at the first position on the operation surface, and outputting the detection value corresponding to a midpoint between the first position and a second position when the operation state is a second operation state in which a second touch operation is performed at the second position on the operation surface in addition to the first touch operation, the program causing a computer to function as:

an acquisition section that acquires a detected position based on the detection value, the detected position indicating a position on the operation surface;

a state determination section that determines whether the operation state is the first operation state or the second operation state based on the detection value;

a correction section that calculates a corrected position when the operation state is the second operation state, one endpoint being indicated by the detected position acquired in the first operation state, a midpoint being indicated by the detected position acquired in the second operation state, and the other endpoint being indicated by the corrected position; and a display control section that controls the image based on the corrected position.

According to a second aspect of the invention, there is provided a program stored in a non-transitory computer-readable information storage medium, the program controlling an image displayed on a display screen of a display section based on a detection value output from a detection section, the detection section outputting the detection value corresponding to a first position when an operation state of a touch operation performed on an operation surface is a first operation state in which a first touch operation is performed at the first position on the operation surface, and outputting the detection value corresponding to a midpoint between the first position and a second position when the operation state is a second operation state in which a second touch operation is performed at the second position on the operation surface in addition to the first touch operation, the program causing a computer to function as:

an acquisition section that acquires a detected position based on the detection value, the detected position indicating a position on the operation surface;

a state determination section that determines whether the operation state is the first operation state or the second operation state based on the detection value;

a correction section that calculates a corrected position when the operation state is the second operation state, one endpoint being indicated by the detected position in the first operation state, a midpoint being indicated by the detected position in the second operation state, and the other endpoint being indicated by the corrected position;

a position determination section that determines whether or not the corrected position coincides with a given position; and a display control section that controls the image.

According to a third aspect of the invention, there is provided a non-transitory computer-readable information storage medium for storing the program.

According to a fourth aspect of the invention, there is provided an image control system that controls an image displayed on a display screen of a display section based on a detection value output from a detection section, the detection section outputting the detection value corresponding to a first position when an operation state of a touch operation performed on an operation surface is a first operation state in which a first touch operation is performed at the first position on the operation surface, and outputting the detection value corresponding to a midpoint between the first position and a second position when the operation state is a second operation state in which a second touch operation is performed at the second position on the operation surface in addition to the first touch operation, the image control system comprising:

an acquisition section that acquires a detected position based on the detection value, the detected position indicating a position on the operation surface;

a state determination section that determines whether the operation state is the first operation state or the second operation state based on the detection value;

a correction section that calculates a corrected position when the operation state is the second operation state, one endpoint being indicated by the detected position acquired in the first operation state, a midpoint being indicated by the detected position acquired in the second operation state, and the other endpoint being indicated by the corrected position; and a display control section that controls the image based on the corrected position.

According to a fifth aspect of the invention, there is provided an image control system that controls an image displayed on a display screen of a display section based on a detection value output from a detection section, the detection section outputting the detection value corresponding to a first position when an operation state of a touch operation performed on an operation surface is a first operation state in which a first touch operation is performed at the first position on the operation surface, and outputting the detection value corresponding to a midpoint between the first position and a second position when the operation state is a second operation state in which a second touch operation is performed at the second position on the operation surface in addition to the first touch operation, the image control system comprising:

an acquisition section that acquires a detected position based on the detection value, the detected position indicating a position on the operation surface;

a state determination section that determines whether the operation state is the first operation state or the second operation state based on the detection value;

a correction section that calculates a corrected position when the operation state is the second operation state, one endpoint being indicated by the detected position in the first operation state, a midpoint being indicated by the detected position in the second operation state, and the other endpoint being indicated by the corrected position;

a position determination section that determines whether or not the corrected position coincides with a given position; and a display control section that controls the image.

BRIEF DESCRIPTION OF THE SEVERAL VIEWS OF THE DRAWING

FIGS. 12A to 12E are diagrams illustrating an example of an image displayed on a game system according to one embodiment of the invention.

DETAILED DESCRIPTION OF THE EMBODIMENT

Figure 1:
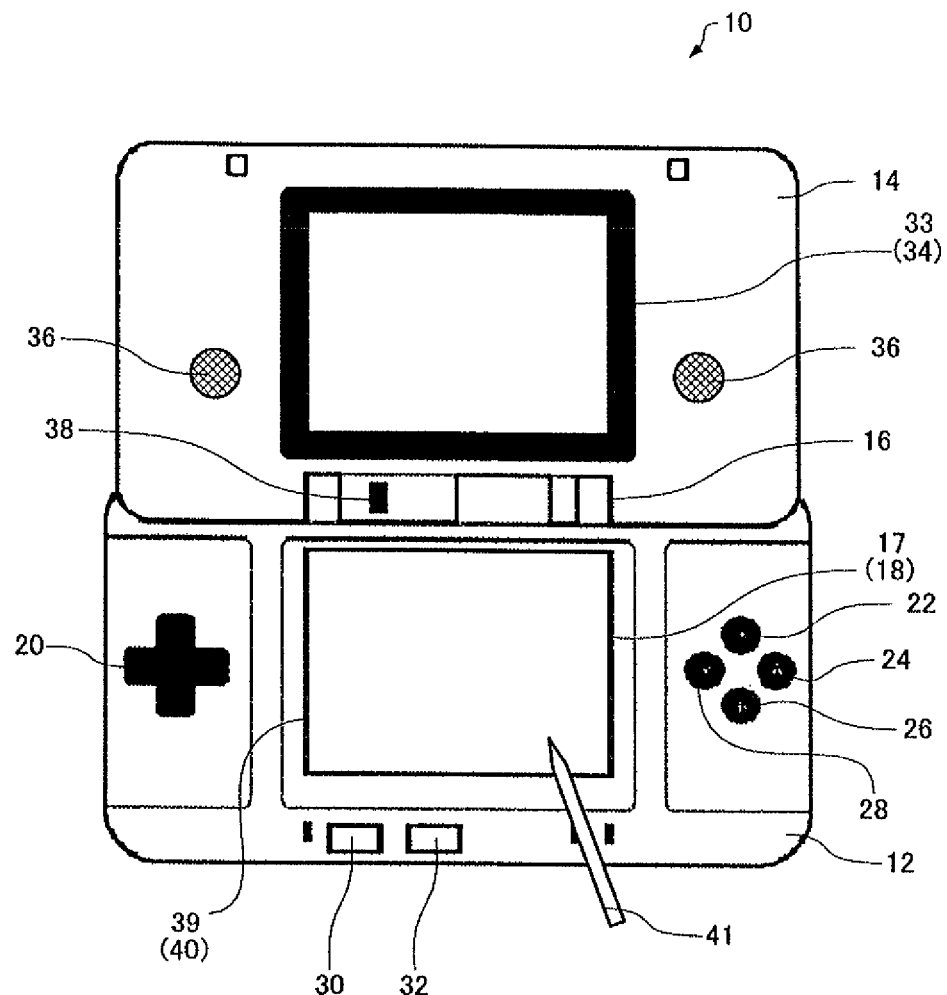
FIG. 1 is an external view illustrating the appearance of a game system according to one embodiment of the invention.

The invention may provide a program, an information storage medium and an image control system that enable a process to be performed based on the position of the touch operation even when the touch operation has been performed at two positions.

(1) One embodiment of the invention relates to an image control system that controls an image displayed on a display screen of a display section based on a detection value output from a detection section, the detection section outputting the detection value corresponding to a first position when an operation state of a touch operation performed on an operation surface is a first operation state in which a first touch operation is performed at the first position on the operation surface, and outputting the detection value corresponding to a midpoint between the first position and a second position when the operation state is a second operation state in which a second touch operation is performed at the second position on the operation surface in addition to the first touch operation, the image control system comprising:

an acquisition section that acquires a detected position based on the detection value, the detected position indicating a position on the operation surface;

a state determination section that determines whether the operation state is the first operation state or the second operation state based on the detection value;

a correction section that calculates a corrected position when the operation state is the second operation state, one endpoint being indicated by the detected position acquired in the first operation state, a midpoint being indicated by the detected position acquired in the second operation state, and the other endpoint being indicated by the corrected position; and a display control section that controls the image based on the corrected position.

Another embodiment of the invention relates to a program that causes a computer to function as each of the above sections and a non-transitory computer-readable information storage medium for storing such a program.

According to the above embodiments, when the first position in the first operation state is maintained when the operation state has transitioned to the second operation state, the corrected position can be calculated so that the corrected position coincides with the second position. Therefore, when the touch operation has been performed at the second position in addition to the first position, the image can be controlled based on the second position.

(2) Another embodiment of the invention relates to an image control system that controls an image displayed on a display screen of a display section based on a detection value output from a detection section, the detection section outputting the detection value corresponding to a first position when an operation state of a touch operation performed on an operation surface is a first operation state in which a first touch operation is performed at the first position on the operation surface, and outputting the detection value corresponding to a midpoint between the first position and a second position when the operation state is a second operation state in which a second touch operation is performed at the second position on the operation surface in addition to the first touch operation, the image control system comprising:

an acquisition section that acquires a detected position based on the detection value, the detected position indicating a position on the operation surface;

a state determination section that determines whether the operation state is the first operation state or the second operation state based on the detection value;

a correction section that calculates a corrected position when the operation state is the second operation state, one endpoint being indicated by the detected position in the first operation state, a midpoint being indicated by the detected position in the second operation state, and the other endpoint being indicated by the corrected position;

a position determination section that determines whether or not the corrected position coincides with a given position; and a display control section that controls the image.

Another embodiment of the invention relates to a program that causes a computer to function as each of the above sections and a non-transitory computer-readable information storage medium for storing such a program.

According to the above embodiments, when the first position in the first operation state is maintained when the operation state has transitioned to the second operation state, the corrected position can be calculated so that the corrected position coincides with the second position. Therefore, when the touch operation has been performed at the second position in addition to the first position, whether or not the second position coincides with a given position can be determined.

(3) In each of the image control system, the program and the information storage medium, the display control section may control the image based on a determination result of the position determination section.

This makes it possible to control the image based on the second position.

(4) In each of the image control system, the program and the information storage medium, the correction section may calculate the corrected position when a new detected position has been acquired in the second operation state, one endpoint being indicated by the detected position acquired in the first operation state, a midpoint being indicated by the detected position currently acquired in the second operation state, and the other endpoint being indicated by the corrected position.

According to this configuration, when the first position in the first operation state is maintained when the second position has changed in the second operation state, the corrected position can be calculated so that the corrected position coincides with the second position.

(5) In each of the image control system, the program and the information storage medium, the correction section may calculate the corrected position when a new detected position has been acquired in the second operation state, one endpoint being indicated by the corrected position initially calculated in the second operation state, a midpoint being indicated by the detected position currently acquired in the second operation state, and the other endpoint being indicated by the corrected position.

According to this configuration, when the first position has changed in the second operation state while the second position is maintained, the corrected position can be calculated so that the corrected position coincides with the first position.

(6) The image control system may further comprise a movement information calculation section that calculates movement information about the corrected position when the corrected position has changed, wherein the display control section may control the image based on the movement information about the corrected position.

The program may further cause a computer to function as a movement information calculation section that calculates movement information about the corrected position when the corrected position has changed, wherein the display control section may control the image based on the movement information about the corrected position.

In the information storage medium, the program may cause the computer to further function as a movement information calculation section that calculates movement information about the corrected position when the corrected position has changed, wherein the display control section may control the image based on the movement information about the corrected position.

This makes it possible to control the image based on the movement of the first position or the second position in the second operation state.

(7) The image control system may further comprise a period measurement section that measures a period of the first operation state, wherein the display control section may control the image based on the period of the first operation state.

The program may further cause a computer to function as a period measurement section that measures a period of the first operation state, wherein the display control section may control the image based on the period of the first operation state.

In the information storage medium, the program may cause the computer to further function as a period measurement section that measures a period of the first operation state, wherein the display control section may control the image based on the period of the first operation state.

This makes it possible to control the image based on the period of the first operation state.

(8) In each of the image control system, the program and the information storage medium, the display control section may display a display object in an overlapping area of the display screen that overlaps the operation surface, the display object identifying a first area where the first touch operation should be performed, and a second area where the second touch operation should be performed.

This makes it possible to guide the operator so that the accuracy of the operation state determination result and the corrected position is improved.

(9) In each of the image control system, the program and the information storage medium, the state determination section may determine that the operation state is a non-operation state in which the touch operation is not performed on the operation surface when the detection value is not output, may determine that the operation state is the first operation state when the detection value has been output when the operation state is the non-operation state, and may determine that the operation state is the second operation state when a moving amount of the detected position has exceeded a first threshold value when the operation state is the first operation state.

This makes it possible to determine a transition in operation state between the non-operation state, the first operation state, and the second operation state.

(10) In each of the image control system, the program and the information storage medium, the state determination section may determine that the operation state is the first operation state when a moving amount of the detected position has exceeded a second threshold value when the operation state is the second operation state.

This makes it possible to determine a transition in operation state from the second operation state to the first operation state.

Embodiments of the invention are described below. Note that the following embodiments do not in any way limit the scope of the invention defined by the claims laid out herein. Note also that all of the elements described in connection with the following embodiments should not be necessarily taken as essential elements for the invention.

1. Outline

FIG. 1 is an external view illustrating the appearance of a game system 10 (i.e., image (display) control system) according to one embodiment of the invention. As illustrated in FIG. 1, the game system 10 is formed to be carried by the player (operator or observer). The player holds the game system 10, and plays the game. A lower main body 12 and an upper main body 14 of the game system 10 are connected via a hinge section 16. The lower main body 12 and the upper main body 14 can be rotated around the axis of the hinge section 16. A first liquid crystal display 18 that displays an image on a rectangular first display screen 17 is provided at the center of the lower main body 12. An arrow key 20, first to fourth buttons 22 to 28, a start button 30, and a select button 32 that allow the player to input operation information are provided around the first liquid crystal display 18. A second liquid crystal display 34 that displays an image on a rectangular second display screen 33 is provided at the center of the upper main body 14. A speaker 36 that outputs sound is provided on each side of the second liquid crystal display 34. A microphone 38 that allows the player to input sound is provided in the hinge section 16.

A touch panel 40 that detects the position of a touch operation performed by the player on a rectangular operation surface 39 is disposed to overlap the first display screen 17 (i.e., overlapping area) of the first liquid crystal display 18. For example, when the player has brought the tip of a touch pen 41 illustrated in FIG. 1 into contact with the operation surface 39, the game system 10 detects the contact position of the tip of the touch pen 41 with the operation surface 39. This makes it possible for the player to input operation information by performing a touch operation on the operation surface 39.

The game system 10 determines that the player has selected an item displayed on the first display screen 17 depending on the touch position on the operation surface 39, generates a character on the first display screen 17 or the second display screen 33, causes the character to move or disappear, or displays a moving path of the touch position on the operation surface 39 so that the player can draw a character or a picture on the first display screen 17. The game system 10 calculates the moving amount, the moving direction, the moving speed, and the like of the touch position on the operation surface 39 based on the moving path of the touch position on the operation surface 39.

Figure 2:
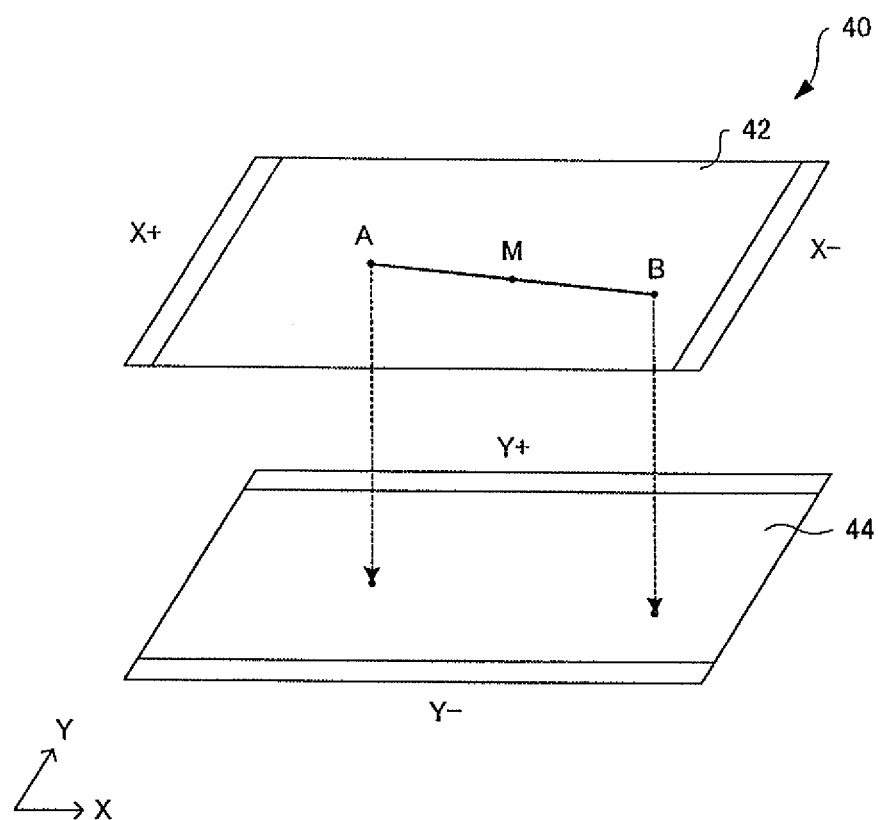
FIG. 2 is an exploded view illustrating a touch panel of a game system according to one embodiment of the invention.

FIG. 2 is an exploded view illustrating the touch panel 40. As illustrated in FIG. 2, the touch panel 40 is an analog resistive touch panel. An X-axis resistive film 42 and a Y-axis resistive film 44 that transmit light are disposed at a small interval through a spacer so that the X-axis resistive film 42 and the Y-axis resistive film 44 are opposite to each other. An X-axis electrode is provided on each end of the X-axis resistive film 42 in an X-axis direction, and a Y-axis electrode is provided on each end of the Y-axis resistive film 44 in a Y-axis direction. A voltage is alternately applied between the X-axis electrodes or the Y-axis electrodes every $\frac{1}{120}$th of a second. When the player has performed a touch operation on the touch panel 40, the X-axis resistive film 42 is warped so that the X-axis resistive film 42 comes in contact with (is electrically connected to) the Y-axis resistive film 44.

For example, when the player has performed a touch operation (i.e., first touch operation) at a point A (i.e., first position) illustrated in FIG. 2, and the X-axis resistive film 42 has come in contact with the Y-axis resistive film 44 at the point A, a voltage (i.e., detection value) divided based on the X-coordinate component at the point A is applied between the Y-axis electrodes when a voltage is applied between the X-axis electrodes, and a voltage (i.e., detection value) divided based on the Y-coordinate component at the point A is applied between the X-axis electrodes when a voltage is applied between the Y-axis electrodes. The touch panel 40 thus alternately outputs the detection value corresponding to the X-coordinate component at the point A and the detection value corresponding to the Y-coordinate component at the point A every $\frac{1}{120}$th of a second when the player performs a touch operation at the point A. Specifically, the touch panel 40 outputs the detection value corresponding to the touch position every $\frac{1}{60}$th of a second.

When using the analog resistive touch panel 40, however, when the player has performed a touch operation (i.e., second touch operation) at a point B (i.e., second position) in addition to the point A, the X-axis resistive film 42 comes in contact with (is electrically connected to) the Y-axis resistive film 44 at the points A and B. In this case, a voltage divided based on the X-coordinate component at the point A and the X-coordinate component at the point B is applied between the Y-axis electrodes when a voltage is applied between the X-axis electrodes, and a voltage (i.e., detection value) divided based on the Y-coordinate component at the point A and the Y-coordinate component at the point B is applied between the X-axis electrodes when a voltage is applied between the Y-axis electrodes. The voltage divided based on the X-coordinate component at the point A and the X-coordinate component at the point B is equal to a voltage divided based on the X-coordinate component at a midpoint M between the points A and B, and the voltage divided based on the Y-coordinate component at the point A and the Y-coordinate component at the point B is equal to a voltage divided based on the Y-coordinate component at the midpoint M between the points A and B. Specifically, when the player has performed a touch operation at the points A and B, the touch panel 40 does not output the detection values corresponding to the touch positions, but outputs the detection value corresponding to the midpoint M between the points A and B.

Therefore, the game system 10 that acquires the coordinates (i.e., position) on the operation surface 39 based on the detection value from the touch panel 40 can acquire the coordinates of the point A when the player has performed a touch operation only at the point A, but acquires the coordinates of the midpoint M between the points A and B when the player has performed a touch operation at the points A and B. In order to deal with such a problem, the game system 10 determines whether the state of the touch operation performed on the operation surface 39 is a first operation state in which the touch operation is performed at one position on the operation surface 39, or a second operation state in which the touch operation is performed at two positions on the operation surface 39 (i.e., state determination process). The game system 10 determines the detected coordinates corresponding to the detection value from the touch panel 40 to be the coordinates of the touch position when the state of the touch operation is the first operation state, and determines the detected coordinates corresponding to the detection value from the touch panel 40 to be the coordinates of the midpoint between the two touch positions when the state of the touch operation is the second operation state. The game system 10 calculates corrected coordinates by correcting the detected coordinates (i.e., correction process), and determines the corrected coordinates to be the coordinates of the touch position.

FIGS. 3A to 3D are diagrams illustrating the state determination process and the correction process. The game system 10 according to this embodiment acquires the detected coordinates every 1/60th of a second (i.e., acquisition timing). The game system 10 determines that the touch operation is not performed on the operation surface 39 (non-operation state) when the detection value is not output from the touch panel 40. When the game system 10 has acquired the detected coordinates of a point P1 in the non-operation state (see FIG. 3A), the game system 10 determines that the touch operation has been performed only at the point P1 (first operation state). Specifically, the game system 10 determines that the touch operation has been performed at one position (first operation state) even if the touch operation has been performed at two positions at the same acquisition timing in the non-operation state, and the game system 10 has acquired the detected coordinates of the midpoint between the two positions. Specifically, since the player rarely performs the touch operation at two positions at the same acquisition timing, the game system 10 determines that the player has brought the touch pen 41 into contact with the point P1 in the non-operation state.

Figure 3A:
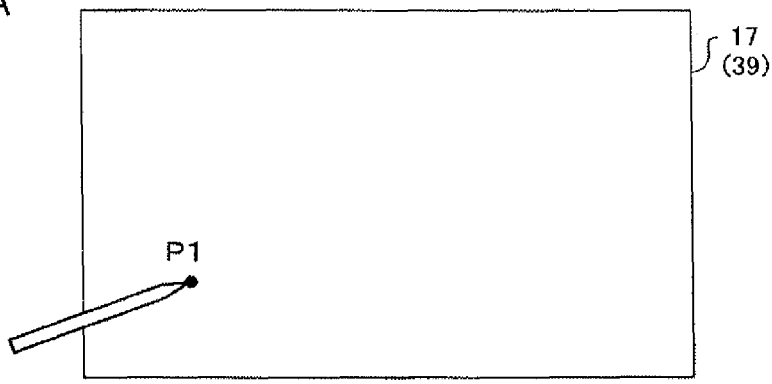
FIGS. 3A to 3D are diagrams illustrating a process performed by a game system according to one embodiment of the invention.
Figure 3B:
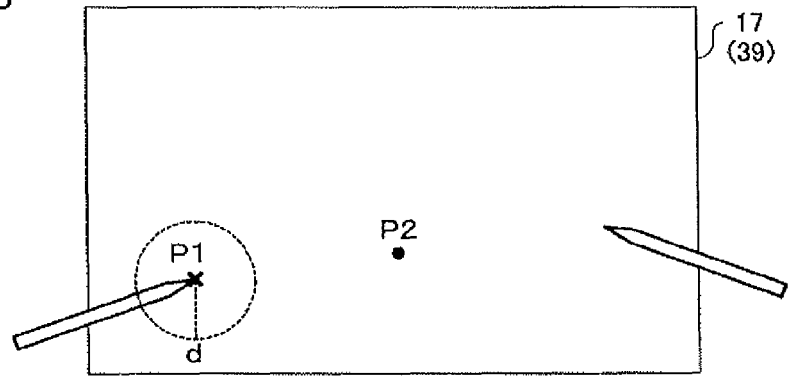

When the next acquisition timing has been reached in the first operation state, the game system 10 determines whether or not the distance between the detected coordinates of a point P2 acquired at the current acquisition timing and the detected coordinates of the point P1 acquired at the preceding acquisition timing is longer than a distance d (i.e., first threshold value) (see FIG. 3B). The distance d is set to be longer than a distance at which the player can move the tip of the touch pen 41 within 1/60th of a second.

Therefore, when the distance between the detected coordinates of the point P2 and the detected coordinates of the point P1 is shorter than the distance d, it may be determined that the player has moved the touch position from the point P1 to the point P2 in a state in which the tip of the touch pen 41 comes in contact with the operation surface 39, and the coordinates of the touch position after the movement have been acquired. On the other hand, when the distance between the detected coordinates of the point P2 and the detected coordinates of the point P1 is longer than the distance d, since the player rarely removes one touch pen 41 from the point P1 and brings another touch pen 41 into contact with the point P2 within 1/60th of a second, it may be determined that the player has brought one touch pen 41 into contact with the point P1, and brought another touch pen 41 into contact with another position on the operation surface 39 without removing the one touch pen 41 from the point P1, and the coordinates of the midpoint between the touch positions of the two touch pens 41 have been acquired. Therefore, when the game system 10 has acquired the detected coordinates of the point P2 that is positioned away from the detected coordinates of the point P1 at a distance longer than the distance d in the first operation state (see FIG. 3B), the game system 10 determines that the touch operation has been performed at the point P1 and another point (second operation state).

Figure 3C:
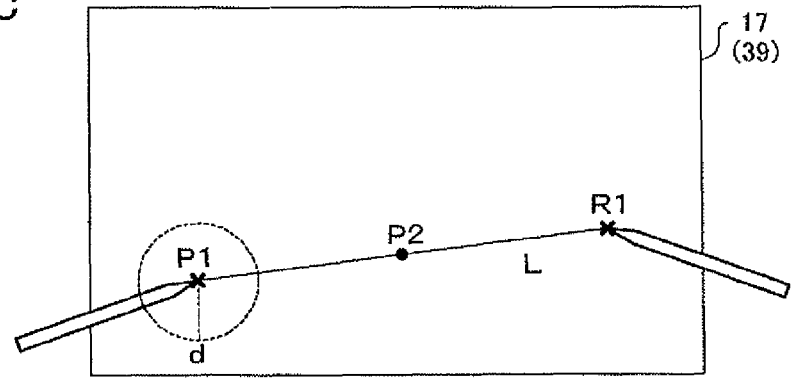

The game system 10 then calculates the coordinates of a point R1, one endpoint of a straight line L being indicated by the detected coordinates of the point P1 acquired at the acquisition timing immediately before the operation state has transitioned to the second operation state, the midpoint of the straight line L being indicated by the detected coordinates of the point P2 acquired at the current acquisition timing, and the other endpoint of the straight line L being indicated by the coordinates of the point R1 (see FIG. 3C). Specifically, the game system 10 calculates an X coordinate R1X of the point R1 from an X coordinate P1X of the point P1 and an X coordinate P2X of the point P2 (i.e., $R1X=2 \cdot P2X-P1X$), and calculates a Y coordinate R1Y of the point R1 from a Y coordinate P1Y of the point P1 and a Y coordinate P2Y of the point P2 (i.e., $R1Y=2 \cdot P2Y-P1Y$). More specifically, the game system 10 determines that the touch position of one touch pen 41 has not moved from the point P1 (i.e., the touch operation is continuously performed) even if the operation state has transitioned to the second operation state, and calculates the coordinates of the point R1 that is estimated to be the touch position of another touch pen 41.

Figure 3D:
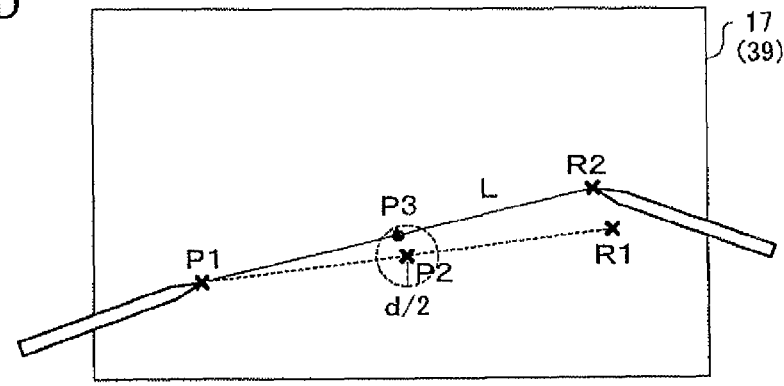

When the next acquisition timing has been reached in the second operation state, the game system 10 determines whether or not the distance between the detected coordinates of a point P3 acquired at the current acquisition timing and the detected coordinates of the point P2 acquired at the preceding acquisition timing is longer than a distance d/2 (i.e., second threshold value) (see FIG. 3D). Since the detected coordinates acquired in the second operation state are the detected coordinates of the midpoint, the distance at which the midpoint can be moved within 1/60th of a second is considered to be about half the distance d at which the player can move the tip of the touch pen 41. Therefore, the distance d/2 is used as the threshold value. Therefore, when the distance between the detected coordinates of the point P3 and the detected coordinates of the point P2 is shorter than the distance d/2, it may be determined that the player has moved the touch position of one touch pen 41 or moved the touch positions of the two touch pens 41 so that the midpoint between the touch positions of the two touch pens 41 has moved. The game system 10 determines that the second operation state is maintained when the distance between the detected coordinates of the point P3 and the detected coordinates of the point P2 is shorter than the distance d/2 (see FIG. 3D).

However, when the player has moved the touch position of each touch pen 41, the coordinates of the point considered to be the touch position of each touch pen 41 cannot be calculated from the coordinates of the midpoint. Therefore, when the distance between the detected coordinates of the point P3 and the detected coordinates of the point P2 is shorter than the distance d/2, the game system 10 determines that the player has maintained the touch position of the tip of one touch pen 41 at the point P1, and moved the tip of the other touch pen 41 from the point R1 without removing the tip of the other touch pen 41 from the operation surface 39, so that the midpoint between the touch positions of the touch pens 41 has moved. The game system 10 then calculates the coordinates of a point R2, one endpoint of the straight line L being indicated by the detected coordinates of the point P1 acquired at the acquisition timing immediately before the operation state has transitioned to the second operation state, the midpoint of the straight line L being indicated by the detected coordinates of the point P3 acquired at the current acquisition timing, and the other endpoint of the straight line L being indicated by the coordinates of the point R2.

Specifically, the game system 10 determines that the player has not moved the touch position of the left touch pen 41 from the point P1 (i.e., has maintained the touch operation) when the midpoint has moved in the second operation state, and calculates the coordinates of the point R2 considered to be the touch position of the right touch pen 41 for which the touch operation on the operation surface 39 has been performed after the touch operation using the left touch pen 41.

When the distance between the detected coordinates of the point P3 and the detected coordinates of the point P2 is longer than the distance d/2, the game system 10 determines that the player has held one touch pen 41 on the operation surface 39, and removed the other touch pen 41 from the operation surface 39, so that the coordinates of the touch position of the one touch pen 41 have been acquired. In this case, the game system 10 determines that the touch operation has been performed only at the point P3 (first operation state).

The game system 10 thus determines whether the operation state is the first operation state, the second operation state, or the non-operation state. If the touch position of the touch pen 41 for which the touch operation has been performed before the touch operation using the other touch pen 41 is maintained at the touch position in the first operation state, the touch position of the other touch pen 41 can be calculated based on the detected coordinates acquired in the second operation state even if the touch position of the other touch pen 41 has changed.

2. Functional blocks

Figure 4:
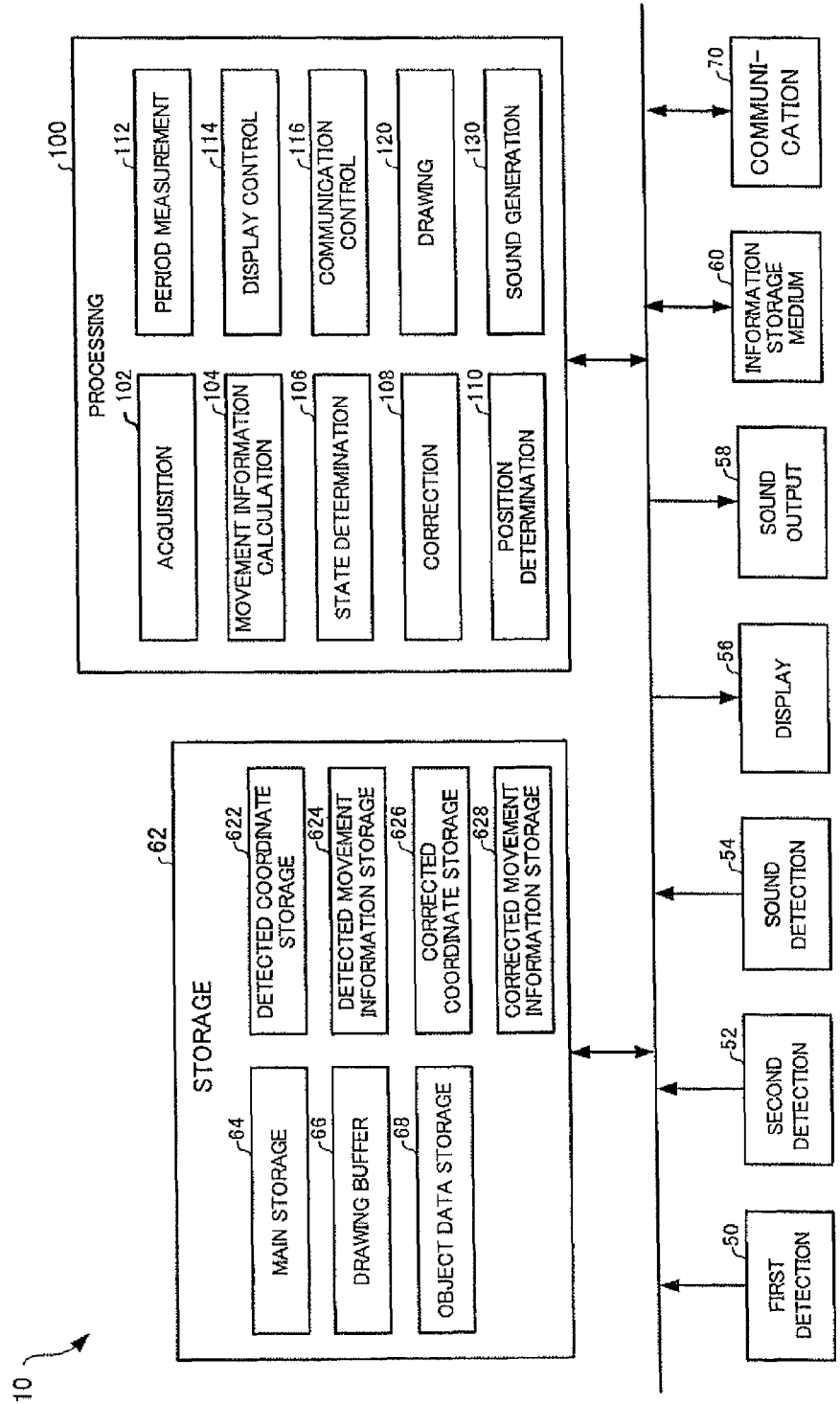
FIG. 4 is a functional block diagram illustrating a game system according to one embodiment of the invention.

FIG. 4 shows an example of a functional block diagram of the game system 10 according to this embodiment. Note that the game system 10 according to this embodiment may have a configuration in which some of the elements (sections) illustrated in FIG. 4 are omitted.

A first detection section 50 detects an operation performed using the arrow key 20, the first to fourth buttons 22 to 28, the start button 30, or the select button 32. The function of the first detection section 50 may be implemented by a switch, a pressure sensor, or the like.

A second detection section 52 detects the touch position of a touch operation performed on the operation surface 39. The function of the second detection section 52 may be implemented by a four-wire or five-wire analog resistive touch panel or the like. Specifically, the second detection section 52 outputs a detection value corresponding to a first position when the operation state is the first operation state in which a first touch operation is performed at the first position on the operation surface 39, and outputs a detection value corresponding to the midpoint between the first position and a second position when the operation state is the second operation state in which a second touch operation is performed at the second position on the operation surface 39 in addition to the first touch operation.

A sound detection section 54 detects external sound (e.g., player's voice or clapping). The function of the sound detection section 54 may be implemented by a microphone or the like.

A display section 56 outputs an image generated by the game system 10. The function of the display section 56 may be implemented by a CRT display, a liquid crystal display, a plasma display, a projector, or the like.

A sound output section 58 outputs sound generated by the game system 10. The function of the sound output section 58 may be implemented by the speaker 36, a headphone, or the like.

An information storage medium 60 (computer-readable medium) stores a program for a processing section 100 to perform various processes, data, and the like. The function of the information storage medium 60 may be implemented by a memory card, an optical disk (CD or DVD), a magneto-optical disk (MO), a magnetic disk, a hard disk, a magnetic tape, or the like.

A storage section 62 functions as a work area for the processing section 100, a communication section 70, and the like. The function of the storage section 62 may be implemented by a RAM, a VRAM, or the like. The storage section 62 according to this embodiment includes a main storage section 64 that is used as a work area for the processing section 100, a drawing buffer 66 in which an image displayed on the display section 56 is drawn, and an object data storage section 68 that stores data of an object (display object) displayed as an image.

The communication section 70 performs various types of control that enables communication with the outside (e.g., server or another portable terminal). The function of the communication section 70 may be implemented by hardware such as a processor or a communication integrated circuit (ASIC), a program, or the like.

A program (data) that causes a computer to function as each section according to this embodiment may be distributed to the information storage medium 60 (storage section 62) from an information storage medium 60 included in a host device (server) through a network and the communication section 70. Use of the information storage medium 60 included in the host device (server) is also included within the scope of the invention.

The processing section 100 (processor) performs a game process, an image generation process, a sound generation process, and the like based on information detected by the first detection section 50, the second detection section 52, the sound detection section 54, and the like, information received by the communication section 70, a program, data, and the like. The processing section 100 performs various processes using the storage section 62 as a work area. The function of the processing section 100 may be implemented by hardware such as a processor (e.g., CPU or DSP) or an integrated circuit (IC) (e.g., ASIC), or a program.

The processing section 100 according to the above embodiment includes an acquisition section 102, a movement information calculation section 104, a state determination section 106, a correction section 108, a position determination section 110, a period measurement section 112, a display control section 114, a communication control section 116, a drawing section 120, and a sound generation section 130. Note that some of these sections may be omitted.

The acquisition section 102 acquires a detected position that indicates a position on the operation surface 39 based on the detection value from the second detection section 52. Specifically, the acquisition section 102 acquires a detected position that indicates a position on the operation surface 39 every 1/60th of a second (acquisition timing) by alternately acquiring the detection value corresponding to the X-coordinate component of the operation surface 39 and the detection value corresponding to the Y-coordinate component of the operation surface 39 from the second detection section 52 every 1/120th of a second. The acquisition section 102 sequentially stores the detected coordinates in a detected coordinate storage section 622 of the storage section 62 at each acquisition timing. The acquisition section 102 stores "NULL" that indicates the absence of the detected coordinates in the detected coordinate storage section 622 when the detected coordinates have not been acquired (i.e., the detection value has not been output from the second detection section 52) at the acquisition timing.

The movement information calculation section 104 calculates detected movement information (i.e., movement information about the detected coordinates) based on the detected coordinates stored in the detected coordinate storage section 622. Specifically, the movement information calculation section 104 calculates a detected moving distance (i.e., distance (moving amount) between a plurality of detected coordinates) based on a plurality of detected coordinates stored at different acquisition timings. The movement information calculation section 104 calculates a detected moving direction (i.e., moving direction of detected coordinates) based on a plurality of detected coordinates stored at different acquisition timings. Specifically, the movement information calculation section 104 calculates a detected moving vector (i.e., moving vector of detected coordinates) based on a plurality of detected coordinates stored at different acquisition timings. The movement information calculation section 104 sequentially stores the detected movement information in a detected movement information storage section 624 of the storage section 62 each time the movement information calculation section 104 calculates the detected movement information.

The state determination section 106 determines whether the operation state is the non-operation state (i.e., a touch operation is not performed on the operation surface 39), the first operation state (i.e., the first touch operation is performed at the first position on the operation surface 39), or the second operation state (i.e., the second touch operation is performed at the second position on the operation surface 39 in addition to the first touch operation) based on the detection value from the second detection section 52. Specifically, the state determination section 106 determines that the operation state is the non-operation state when the detection value has not been output from the second detection section 52, determines that the operation state is the first operation state when the detection value has been output from the second detection section 52 when the operation state is the non-operation state, determines that the operation state is the second operation state when the moving amount of the detected coordinates exceeds the first threshold value when the operation state is the first operation state, and determines that the operation state is the first operation state when the moving amount of the detected coordinates exceeds the second threshold value when the operation state is the second operation state.

The state determination section 106 determines that the operation state is the non-operation state when "NULL" is stored in the detected coordinate storage section 622, and sets a state flag stored in the storage section 62 to the non-operation state. The state determination section 106 determines that the operation state has transitioned to the first operation state at the current acquisition timing when the detected coordinates have been stored at the current acquisition timing when the operation state is the non-operation state, and sets the state flag stored in the storage section 62 to the first operation state.

The state determination section 106 determines that the operation state has transitioned to the non-operation state at the current acquisition timing when "NULL" has been stored at the current acquisition timing when the operation state is the first operation state, and sets the state flag stored in the storage section 62 to the non-operation state. The state determination section 106 determines whether or not the moving distance calculated by the movement information calculation section 104 is longer than the distance d illustrated in FIG. 3B when the detected coordinates have been stored at the current acquisition timing when the operation state is the first operation state. The state determination section 106 determines that the first operation state is maintained when the moving distance calculated by the movement information calculation section 104 is equal to or shorter than the distance d, and maintains the state flag stored in the storage section 62 in the first operation state. The state determination section 106 determines that the operation state has transitioned to the second operation state at the current acquisition timing when the moving distance calculated by the movement information calculation section 104 is longer than the distance d, and sets the state flag stored in the storage section 62 to the second operation state.

The state determination section 106 determines that the operation state has transitioned to the non-operation state at the current acquisition timing when "NULL" has been stored at the current acquisition timing when the operation state is the second operation state, and sets the state flag stored in the storage section 62 to the non-operation state. The state determination section 106 determines whether or not the moving distance calculated by the movement information calculation section 104 is longer than the distance d/2 illustrated in FIG. 3D when the detected coordinates have been stored at the current acquisition timing when the operation state is the second operation state. The state determination section 106 determines that the second operation state is maintained when the moving distance calculated by the movement information calculation section 104 is equal to or shorter than the distance d/2, and maintains the state flag stored in the storage section 62 in the second operation state. The state determination section 106 determines that the operation state has transitioned to the first operation state at the current acquisition timing when the moving distance calculated by the movement information calculation section 104 is longer than the distance d/2, and sets the state flag stored in the storage section 62 to the first operation state.

The correction section 108 calculates corrected coordinates when the operation state is the second operation state, one endpoint being indicated by the detected coordinates in the first operation state, a midpoint being indicated by the detected coordinates in the second operation state, and the other endpoint being indicated by the corrected coordinates. Specifically, the correction section 108 calculates the corrected coordinates, one endpoint of a straight line being indicated by the detected coordinates stored at the acquisition timing in the first operation state immediately before the operation state has transitioned to the second operation state, the midpoint of the straight line being indicated by the detected coordinates stored at the current acquisition timing, and the other endpoint of the straight line being indicated by the corrected coordinates. More specifically, the correction section 108 determines that the touch position of the first touch operation has not moved from the touch position in the first operation state even if the operation state has transitioned from the first operation state to the second operation state, and calculates the coordinates on the operation surface 39 that are considered to be the touch position of the second touch operation as the corrected coordinates. The correction section 108 sequentially stores the corrected coordinates in a corrected coordinate storage section 626 of the storage section 62 at each acquisition timing.

The movement information calculation section 104 calculates corrected movement information (i.e., movement information about corrected coordinates) based on the corrected coordinates stored in the corrected coordinate storage section 626. Specifically, the movement information calculation section 104 calculates a corrected moving distance (i.e., distance (moving amount) between a plurality of corrected coordinates) based on a plurality of corrected coordinates stored at different acquisition timings. The movement information calculation section 104 calculates a corrected moving direction (i.e., moving direction of corrected coordinates) based on a plurality of corrected coordinates stored at different acquisition timings. Specifically, the movement information calculation section 104 calculates a corrected moving vector (i.e., moving vector of corrected coordinates) based on a plurality of corrected coordinates stored at different acquisition timings. The movement information calculation section 104 sequentially stores the corrected movement information in the corrected movement information storage section 628 of the storage section 62 each time the movement information calculation section 104 calculates the corrected movement information.

The position determination section 110 determines whether or not the detected coordinates acquired by the acquisition section 102 or the corrected coordinates calculated by the correction section 108 coincide with given coordinates. Specifically, the position determination section 110 determines whether or not the detected coordinates or the corrected coordinates are coordinates (i.e., given coordinates) that are positioned within a predetermined range of the operation surface 39, or determines whether or not the detected coordinates or the corrected coordinates are coordinates (i.e., given coordinates) that are positioned within a range corresponding to the display position of an object displayed on the first display screen 17 of the first liquid crystal display 18.

The period measurement section 112 measures the period of the first operation state, the period of the second operation state, or the period of the non-operation state. Specifically, the period measurement section 112 starts to update the count value of a first counter of the storage section 62 when the operation state has been set to the first operation state, and resets the count value of the first counter to the initial value when the first operation state has ended. The period measurement section 112 starts to update the count value of a second counter of the storage section 62 when the operation state has been set to the second operation state, and resets the count value of the second counter to the initial value when the second operation state has ended. The period measurement section 112 starts to update the count value of a third counter of the storage section 62 when the operation state has been set to the non-operation state, and resets the count value of the third counter to the initial value when the non-operation state has ended.

The display control section 114 controls an image (object image) displayed on the display section 56 based on information detected by the first detection section 50, the second detection section 52, the sound detection section 54, and the like, information received by the communication section 70, a program, and the like. Specifically, the display control section 114 generates a display target object (e.g. character, moving object, course, building, tree, pillar, wall, map, or background), instructs display and the display position of the object, or causes the object to disappear, for example. Specifically, the display control section 114 registers the generated object in an object list, transfers the object list to the drawing section 120 or the like, or deletes the object that has disappeared from the object list, for example. The display control section 114 performs a movement process and a motion process.

The display control section 114 performs the movement process that moves the object in an object space (movement simulation) based on information detected by the first detection section 50, the second detection section 52, the sound detection section 54, and the like, information received by the communication section 70, a program (movement algorithm), data (movement data), and the like. Specifically, the display control section 114 performs a simulation process that sequentially calculates object movement information (position, rotational angle, speed, or acceleration) every frame (1/60th of a second). The term "frame" refers to a time unit used when performing the object movement process or the image generation process.

The display control section 114 performs the motion process that causes the object to make a motion (animation) in the object space (motion simulation) based on information detected by the first detection section 50, the second detection section 52, the sound detection section 54, and the like, information received by the communication section 70, a program (motion algorithm), data (motion data), and the like. Specifically, the display control section 114 performs a simulation process that sequentially calculates object motion information (position or rotational angle of each part that forms the object) every frame (1/60th of a second).

In this embodiment, the display control section 114 displays objects for identifying a first area used for the first touch operation and a second area used for the second touch operation on the first display screen 17 of the first liquid crystal display 18. For example, the display control section 114 displays an object that indicates the first area and an object that indicates the second area, or displays an object that indicates the boundary of the first area and the boundary of the second area.

In this embodiment, the display control section 114 changes the color of the image along the moving path of the detected coordinates or the corrected coordinates, changes the displayed image to another image, generates the object, causes the object to disappear or be deformed, moves the object, or causes the object to make a motion based on the detected coordinates, the detected movement information, the corrected coordinates, the corrected movement information, the count value of the first counter, the count value of the second counter, and the count value of the third counter, for example.

The communication control section 116 generates a packet transmitted to another game system 10, designates the network address of the packet transmission destination game system 10, stores a received packet in the storage section 62, analyzes the received packet, and controls the communication section 70 relating to packet transmission and reception, for example. In this embodiment, the communication control section 116 generates a data packet and a command packet necessary for executing the game via a network (e.g., Internet), and causes the communication section 70 to transmit and receive the data packet and the command packet.

The drawing section 120 performs a drawing process based on the results of various processes (game process) performed by the processing section 100 to generate an image, and outputs the generated image to the display section 56.

The sound generation section 130 performs a sound generation process based on the results of various processes performed by the processing section 100 to generate game sound such as background music (BGM), effect sound, or voice, and outputs the generated game sound to the sound output section 58.

The image generation system according to this embodiment may be a system dedicated to a single-player mode that allows only one player to play the game, or may be a system that is provided with a multi-player mode in which a plurality of players can play the game. When a plurality of players play the game, a game image and game sound supplied to each player may be generated using one terminal, or may be generated by a distributed process using a plurality of terminals (game devices or portable telephones) connected via a network (transmission line or communication line), for example.

3. Application Example

An example of the game executed by the game system 10 according to this embodiment is described below. An example in which the player performs a touch operation on the operation surface 39 with the fingertip is described below.

Figure 5:
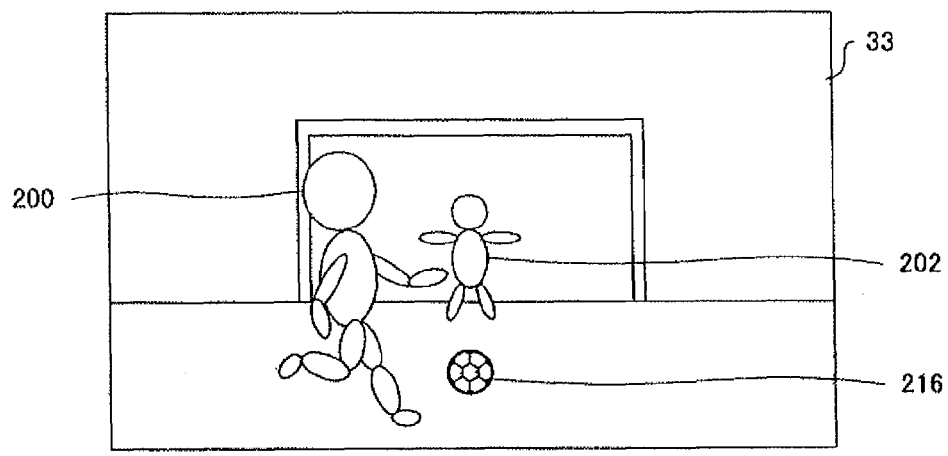
FIG. 5 is a diagram illustrating an example of an image displayed on a game system according to one embodiment of the invention.
Figure 5:
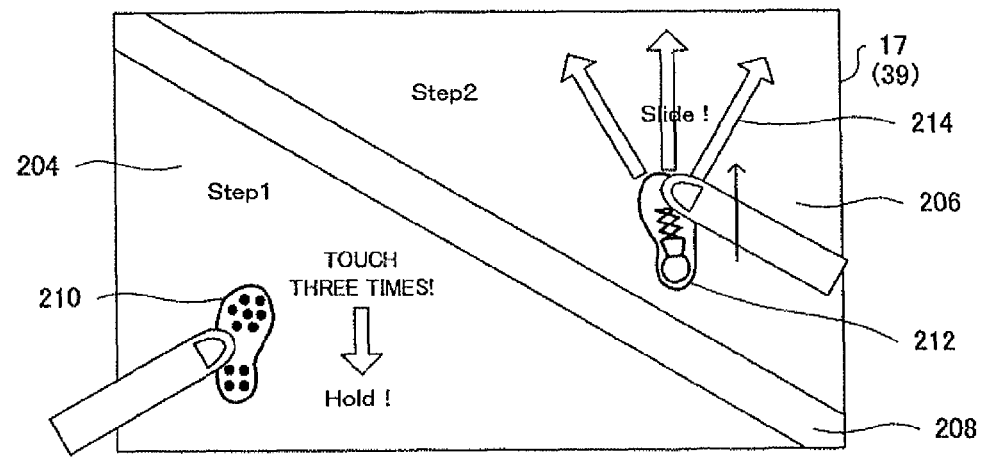

FIG. 5 is a diagram illustrating an example in which the game system 10 executes a soccer PK game. In the example illustrated in FIG. 5, a player character 200 operated by the player is displayed on the front side of the second display screen 33, and a computer character 202 operated by the game system 10 is displayed on the interior side of the second display screen 33. In the example illustrated in FIG. 5, the player character 200 is a kicker, and the computer character 202 is a goalkeeper.

A partition object 208 that divides the operation surface 39 into a left area 204 (i.e., first area) and right area 206 (i.e., area) is displayed on the first display screen 17 that overlaps the operation surface 39. In the game illustrated in FIG. 5, it is recommended by a manual or the like that the player perform a touch operation on the left area 204 with the tip of an arbitrary finger of the left hand, and perform a touch operation on the right area 206 with the tip of an arbitrary finger of the right hand.

A left sole object 210 (i.e., first area) that indicates the left sole of the player character 200, and characters ("Touch three times!" and "Hold!") that indicate the number and the pattern of touch operations on the left area 204 are displayed in the left area 204. The characters "Touch three times!" instruct the player to perform a touch operation (i.e., momentarily touch the left area 204 with the tip of an arbitrary finger of the left hand) on the left area 204 three times, and the characters "Hold!" instruct the player to perform a hold operation (i.e., continuously touch the left area 204 with the tip of an arbitrary finger of the left hand) (i.e., first touch operation). A right foot object 212 (i.e., second area) that indicates the right foot of the player character 200, three arrow objects 214 (i.e., second area) that extend from the right foot object 212 in the upper right direction, the upper direction, and the upper left direction, respectively, and characters ("Slide!") that indicate the pattern of a touch operation on the right area 206 are displayed in the right area 206. The characters "Slide!" instruct the player to perform a slide operation (i.e., move the touch position while touching the right area 206 with the tip of an arbitrary finger of the right hand) (i.e., second touch operation) on the right area 206. The characters "Step 1" displayed in the left area 204 instruct the player to perform the touch operation on the left area 204 before performing the touch operation on the right area 206, and the characters "Step 2" displayed in the right area 206 instruct the player to perform the touch operation on the right area 206 after performing the touch operation on the left area 204. Specifically, a touch operation order display is disposed in each of the left area 204 and the right area 206.

This makes it possible for the player to easily determine the type of touch operation required by observing the first display screen 17. Moreover, it is possible to guide the player so that the position where the player performs the hold operation is distant to a certain extent from the position where the player performs the slide operation on the operation surface 39 by displaying the partition object 208, the left sole object 210, and the right foot object 212, so that the accuracy of the operation state determination result and the corrected coordinates can be improved.

When the player has performed the touch operation on the left area 204, an image in which the player character 200 runs up toward a ball 216 each time the player performs the touch operation is displayed. When the player has performed the hold operation on the left area 204 after performing the touch operation three times, an image in which the player character 200 raises the right foot backward and puts the weight on the left is displayed. Specifically, an image in which the player character 200 prepares to perform a kick operation is displayed when the player performs the hold operation on the left area 204. In this case, the period in which the player performs the hold operation (i.e., period of the first operation state) is counted.

When the player has started the slide operation on the right area 206, the count operation is terminated, and the moving vector of the detected coordinates is calculated based on the detected coordinates acquired at twelve acquisition timings (0.2 seconds (12 frames)) after the player has started the slide operation. The vertical moving direction of the ball 216 is determined based on the period in which the player performed the hold operation, the horizontal moving direction of the ball 216 is determined based on the moving direction of the detected coordinates due to the slide operation, and the moving speed of the ball 216 is determined based on the moving speed (i.e., the moving amount within 0.2 seconds) of the detected coordinates due to the slide operation. An image in which the player character 200 kicks the ball 216, and the ball 216 moves forward based on the determined moving direction and moving speed is then displayed.

When the player has started the slide operation after finishing the hold operation (i.e., after removing the tip of an arbitrary finger of the left hand from the left area 204) (i.e., the operation state is the first operation state in which the touch operation is performed at one position on the operation surface 39), the detected coordinates corresponding to the touch position of the slide operation are acquired. In this case, the moving speed of the ball 216 corresponding to the moving speed of the touch position of the slide operation is determined by calculating the moving speed of the ball 216 corresponding to the moving vector of the detected coordinates. However, when the player has started the slide operation before finishing the hold operation (i.e., before removing the tip of an arbitrary finger of the left hand from the left area 204) (i.e., the operation state is the second operation state in which the touch operation is simultaneously performed at two positions on the operation surface 39), the detected coordinates corresponding to the midpoint between the touch position of the hold operation and the touch position of the slide operation are acquired. In this case, the moving speed of the ball 216 corresponding to the moving speed of the touch position of the slide operation is not determined by calculating the moving speed of the ball 216 corresponding to the moving vector of the detected coordinates.

Figure 6:
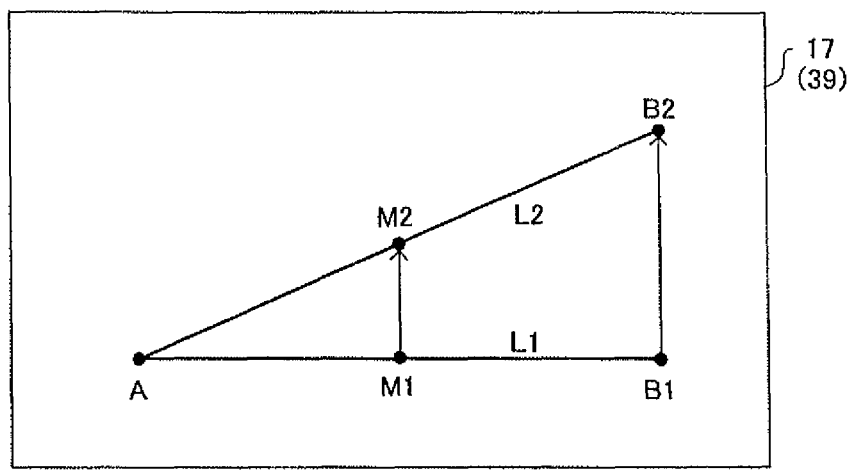
FIG. 6 is a diagram illustrating a process performed by a game system according to one embodiment of the invention.

As illustrated in FIG. 6, when the player has performed the slide operation after finishing the hold operation at the point A, and the moving vector of the detected coordinates is a vector B1B2, the moving vector of the detected coordinates is a vector M1M2 when the player has performed the same slide operation while performing the hold operation at the point A. Therefore, when the player has performed the slide operation while performing the hold operation, the moving direction of the detected coordinates is the same (parallel) as that when the player has performed the slide operation after finishing the hold operation, but the moving speed (moving amount) of the detected coordinates is half that when the player has performed the slide operation after finishing the hold operation.

In order to deal with such a problem, when the player has performed the slide operation while performing the hold operation (i.e., the operation state has been determined to be the second operation state), the game system 10 according to this embodiment determines that the player has maintained the hold operation at the point A during a period of 0.2 seconds in which the detected coordinates due to the slide operation are acquired, and calculates the corrected coordinates by correcting the detected coordinates. For example, when the detected coordinates indicate the coordinates of the point M1, the game system 10 calculates the coordinates of the point B1 as the corrected coordinates, one endpoint of a straight line L1 being the point A, the midpoint of the straight line L1 being the point M1, and the other endpoint of the straight line L1 being the point B1. When the detected coordinates indicate the coordinates of the point M2, the game system 10 calculates the coordinates of the point B2 as the corrected coordinates, one endpoint of a straight line L2 being the point A, the midpoint of the straight line L2 being the point M2, and the other endpoint of the straight line L2 being the point 132. A vector B1B2 considered to be the moving vector of the detected coordinates due to the slide operation performed by the player after the player has finished the hold operation is obtained by calculating the moving vector of the corrected coordinates. The moving speed of the ball 216 corresponding to the moving speed of the touch position of the slide operation is determined by calculating the moving speed of the ball 216 based on the moving vector of the corrected coordinates.

The game system 10 according to this embodiment can thus determine the moving speed of the ball 216 corresponding to the moving speed of the touch position of the slide operation irrespective of whether the player has performed the slide operation after finishing the hold operation or performed the slide operation while performing the hold operation. Specifically, the game system 10 according to this embodiment can move the ball 216 so that the player is not given a wrong impression even if the operation state has transitioned to the second operation state in which the touch operation is simultaneously performed at two positions on the operation surface 39. The game system 10 according to this embodiment can thus implement an interface environment suitable for a case where the player performs the touch operation on the operation surface 39 of the touch panel 40 with the tip of an arbitrary finger of each hand.

4. Process According to this Embodiment

The flow of the process performed by the game system 10 according to this embodiment is described below.

Figure 7:
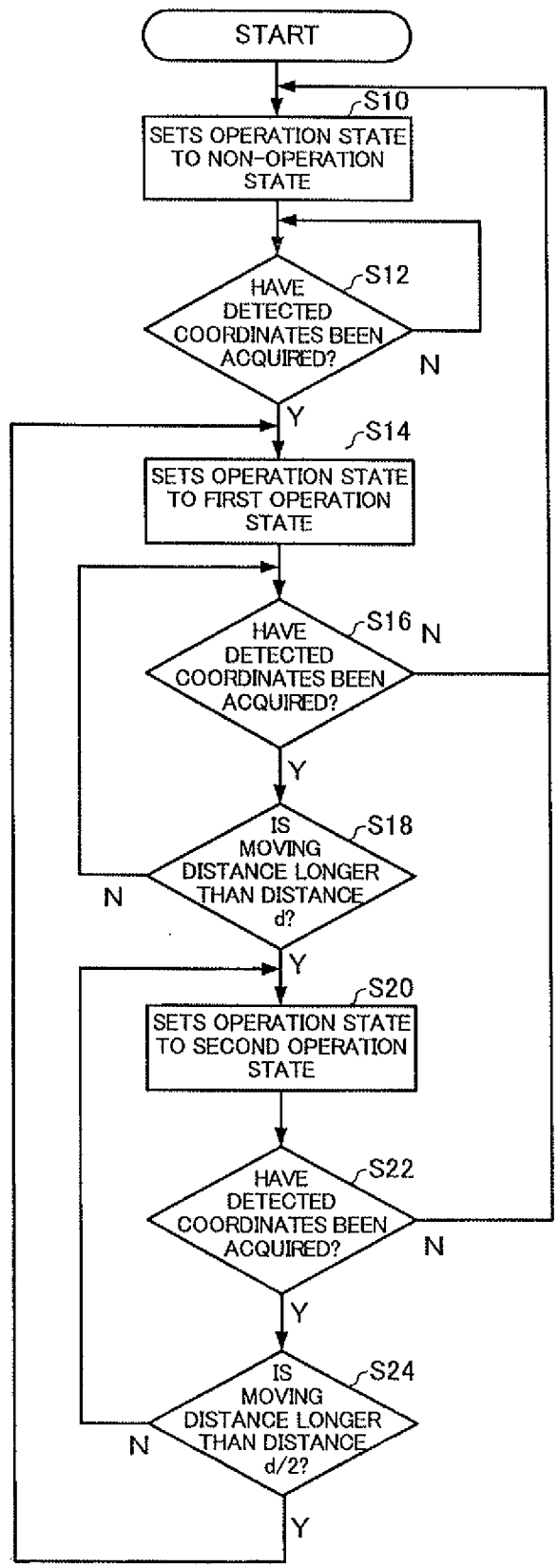
FIG. 7 is a flowchart illustrating the flow of a process performed by a game system according to one embodiment of the invention.

FIG. 7 is a flowchart illustrating the flow of an operation state transition process that allows a transition in the operation state of the touch operation performed on the operation surface 39. The operation state is set to the non-operation state (i.e., initial state) (step S10). When the detected coordinates have not been acquired at the acquisition timing in the non-operation state (N in step S12), the step S12 is performed again. When the detected coordinates have been acquired at the acquisition timing in the non-operation state (Y in step S12), the operation state is set to the first operation state (step S14).

When the detected coordinates have not been acquired at the acquisition timing in the first operation state (N in step S16), the operation state is set to the non-operation state (step S10). When the detected coordinates have been acquired at the acquisition timing in the first operation state (Y in step S16), it is determined whether or not the moving distance (i.e., the distance between the detected coordinates acquired at the current acquisition timing and the detected coordinates acquired at the preceding acquisition timing) is longer than the distance d (step S18). When the moving distance is equal to or shorter than the distance d (N in step S18), the step S16 is performed again. When the moving distance is longer than the distance d (Y in step S18), the operation state is set to the second operation state (step S20).

When the detected coordinates have not been acquired at the acquisition timing in the second operation state (N in step S22), the operation state is set to the non-operation state (step S10). When the detected coordinates have been acquired at the acquisition timing in the second operation state (Y in step S22), it is determined whether or not the moving distance (i.e., the distance between the detected coordinates acquired at the current acquisition timing and the detected coordinates acquired at the preceding acquisition timing) is longer than the distance d/2 (step S24). When the moving distance is longer than the distance d/2 (Y in step S24), the operation state is set to the first operation state (step S14). When the moving distance is equal to or shorter than the distance d/2 (N in step S24), the step S22 is performed again.

Figure 8:
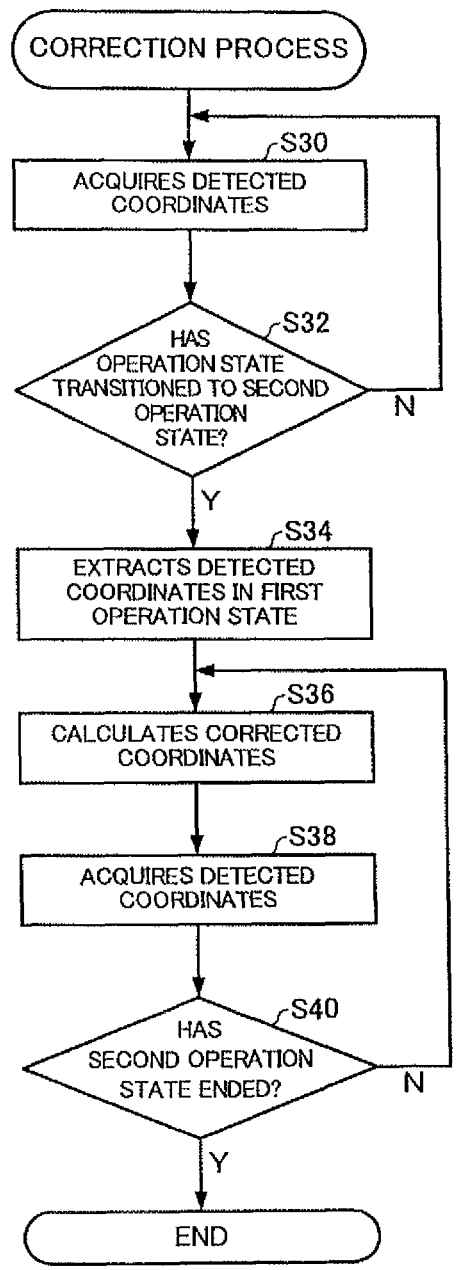
FIG. 8 is a flowchart illustrating the flow of a process performed by a game system according to one embodiment of the invention.

FIG. 8 is a flowchart illustrating the flow of a correction process that calculates the corrected coordinates by correcting the detected coordinates. The detected coordinates are acquired every 1/60th of a second (acquisition timing) (step S30). When the operation state has transitioned to the second operation state based on the detected coordinates acquired at the acquisition timing (Y in step S32), the detected coordinates in the first operation state acquired at the acquisition timing immediately before the operation state has transitioned to the second operation state are extracted from the detected coordinate storage section 622 (step S34). The corrected coordinates are then calculated, one endpoint being indicated by the extracted detected coordinates in the first operation state, a midpoint being indicated by the detected coordinates acquired at the current acquisition timing, and the other endpoint being indicated by the corrected coordinates (step S36).

The detected coordinates are acquired at the next acquisition timing (step S38). When the second operation state does not end based on the detected coordinates acquired at the above acquisition timing (N in step S40), the step S36 is performed again, and the corrected coordinates are calculated, one endpoint being indicated by the extracted detected coordinates in the first operation state, a midpoint being indicated by the detected coordinates stored at the current acquisition timing, and the other endpoint being indicated by the corrected coordinates (step S36). When the second operation state has ended based on the detected coordinates acquired at the above acquisition timing (Y in step S40), the correction process is terminated.

Figure 9:
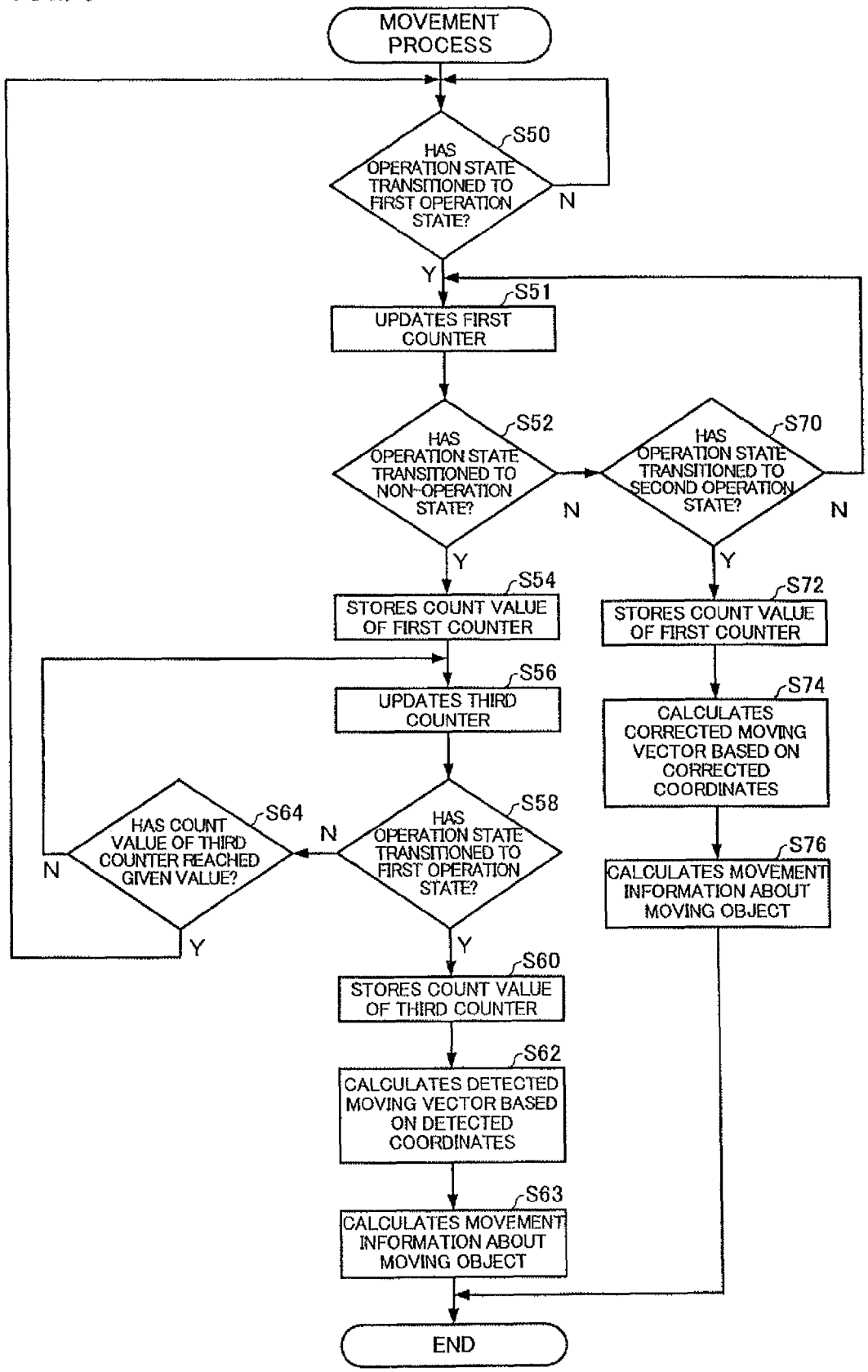
FIG. 9 is a flowchart illustrating the flow of a process performed by a game system according to one embodiment of the invention.

FIG. 9 is a flowchart illustrating a flow of a movement process that calculates the movement information about a moving object (ball 216) displayed on the screen. When the hold operation has been performed after the touch operation has been performed three times so that the operation state has transitioned to the first operation state (Y in step S50), the count value of the first counter that counts the period in which the hold operation is performed is updated (step S51).

When the operation state has transitioned to the non-operation state (the hold operation performed on the left area 204 illustrated in FIG. 5 has ended) (Y in step S52), the count value of the first counter is stored (step S54), and the count value of the third counter that counts the period in which the non-operation state is performed is updated (step S56). When the operation state has transitioned to the first operation state (the slide operation has been performed on the right area 206 after the hold operation performed on the left area 204 illustrated in FIG. 5 has ended) (Y in step S58), the count value of the third counter is stored (step S60), and the detected moving vector is calculated based on the detected coordinates at the first frame and the detected coordinates at the twelfth frame after the slide operation has started (step S62). Specifically, the corrected coordinates are not used since the slide operation has been performed after the hold operation has ended. The movement information about the moving object is calculated based on the value of the first counter, the value of the third counter, and the detected moving vector (step S63).

Specifically, the moving direction of the moving object is calculated so that the moving direction is more closely aligned with the vertical direction as the count value of the first counter increases (i.e., the hold operation is performed for a longer period), and the moving speed of the moving object is calculated so that the moving speed decreases as the count value of the third counter increases (i.e., the period between the hold operation and the slide operation increases). Therefore, it is necessary to reduce the period between the hold operation and the slide operation in order to increase the moving speed of the moving object.

When the count value of the third counter has reached a given value (e.g., a value corresponding to 3 seconds) (Y in step S64) without the operation state transitioning to the first operation state (N in step S58) after the count value of the third counter has been updated (step S56) (i.e., the slide operation is not performed after 3 seconds has elapsed after the hold operation has ended), the hold operation (i.e., the preparatory operation of the player character 200) is canceled, and the step S50 is performed again.

When the operation state has transitioned to the second operation state (the slide operation has been performed in a state in which the hold operation is performed on the left area 204 illustrated in FIG. 5) (Y in step S70) without the operation state transitioning to the non-operation state in the step S52 (N in step S52), the count value of the first counter is stored (step S72), and the corrected moving vector is calculated based on the corrected coordinates at the first frame and the corrected coordinates at the twelfth frame after the slide operation has started (step S74). Specifically, the corrected coordinates are used since the slide operation has been performed in a state in which the hold operation is performed. The movement information about the moving object is then calculated based on the count value of the first counter and the corrected moving vector (step S76).

The player may perform the slide operation while performing the hold operation in order to increase the moving speed of the moving object by reducing the period between the hold operation and the slide operation as much as possible. In this case, the moving object can be moved corresponding to the touch position of the slide operation using the method according to this embodiment.

5. Modification

The invention is not limited to the above embodiments. Various modifications and variations may be made. Several modifications are described below. Various methods described in connection with the above embodiments and the following modifications may be appropriately combined as a control method that implements the invention.

5-1. First Modification

The above embodiments have been described taking an example in which an image in which the player character 200 raises the right foot backward is displayed (the game progresses) when the player has performed the hold operation on the left area 204 (see FIG. 5). Note that the game may be caused to progress based on the first touch operation performed on a narrow first area (e.g., left sole object 210). An object that indicates such a first area may be displayed in the peripheral area of the first display screen 17. This makes it possible to more effectively guide the touch position of the touch operation, so that the accuracy of the operation state determination result and the corrected coordinates can be improved.

The above embodiments have been described taking an example in which the state determination section 106 determines the operation state is the first operation state when the detection value has been output from the second detection section 52 when the operation state is the non-operation state. Note that the state determination section 106 may determine that the operation state is the first operation state when the detected coordinates corresponding to the first area have been acquired.

The above embodiments have been described taking an example in which the distance d is set as the first threshold value of the moving amount of the detected coordinates in the first operation state, and the distance d/2 is set as the second threshold value of the moving amount of the detected coordinates in the second operation state. Note that the first threshold value may be the same as the second threshold value, or the second threshold value may be larger than the first threshold value.

The above embodiments have been described taking an example in which the state determination section 106 determines the operation state based on the moving amount of the detected coordinates. However, since a pulse (overshoot) occurs as a change in voltage applied to the X-axis electrodes or the Y-axis electrode of the touch panel 40 at a moment at which the operation state transitions from the first operation state to the second operation state, and vice versa, the state determination section 106 may determine that the operation state has transitioned from the first operation state to the second operation state, and vice versa, based on occurrence of a pulse.

5-2. Second Modification

The above embodiments have been described taking an example in which the moving object is moved irrespective of whether the player has performed the slide operation after finishing the hold operation or performed the slide operation while performing the hold operation (see the example illustrated in FIG. 5). Note that the moving object may not be moved when the player does not perform the slide operation while performing the hold operation (i.e., the touch operation in the second operation state).

The moving object may be moved based on a state parameter of the player character or the type of player character. For example, the moving amount, the moving direction, the moving speed, and the moving accuracy of the moving object may be changed based on a fatigue level parameter of the player character. For example, when applying the game system 10 to a golf game, the moving amount, the moving direction, the moving speed, and the moving accuracy of the moving object may be changed based on the type of club held by the player character.

The above embodiments have been described taking an example in which the corrected coordinates are calculated in the second operation state, and the moving object is moved based on the movement information about the corrected coordinates. Note that the corrected coordinates may not be calculated in the second operation state. In this case, the display control section 114 may move the moving object based on the moving amount of the detected coordinates when the operation state is the first operation state without performing the conversion process on the moving amount of the detected coordinates, and may perform the conversion process on the moving amount of the detected coordinates when the operation state is the second operation state, and move the moving object based on the moving amount of the detected coordinates. In the example illustrated in FIG. 5, when the player has performed the slide operation while performing the hold operation, the moving direction of the detected coordinates is the same (parallel) as that when the player has performed the slide operation after finishing the hold operation, and the moving speed (moving amount) of the detected coordinates is half that when the player has performed the slide operation after finishing the hold operation. Therefore, the moving speed and the moving amount of the moving object may be calculated after doubling the moving speed (moving amount) of the detected coordinates. This makes it possible to move the moving object corresponding to the movement of the first position or the second position in the second operation state without calculating the corrected coordinates.

5-3. Third Modification

Figure 10A:
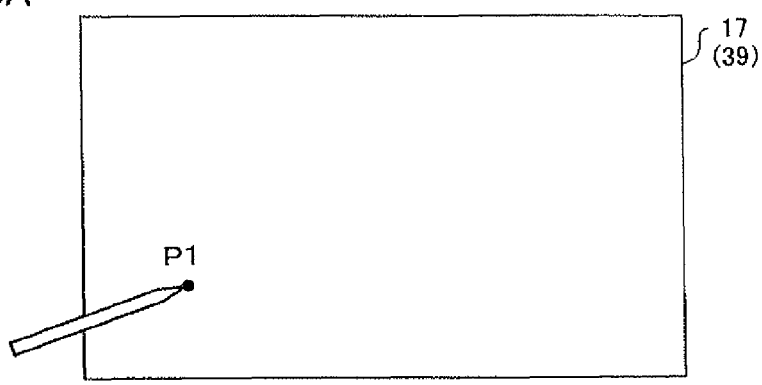
FIGS. 10A to 10D are diagrams illustrating a process performed by a game system according to one embodiment of the invention.
Figure 10B:
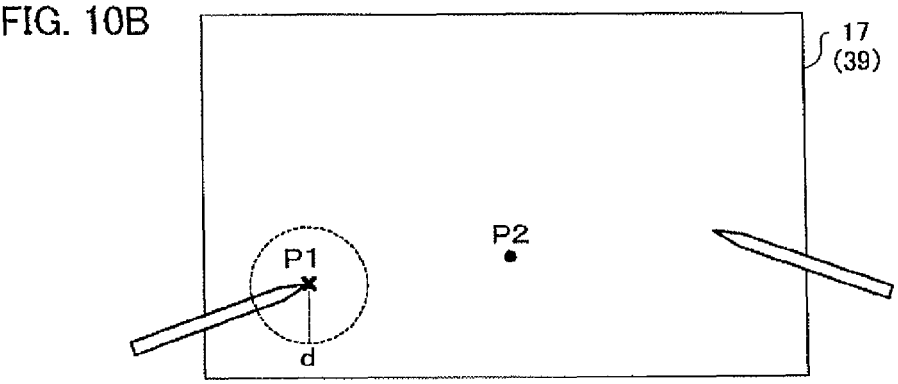
Figure 10C:
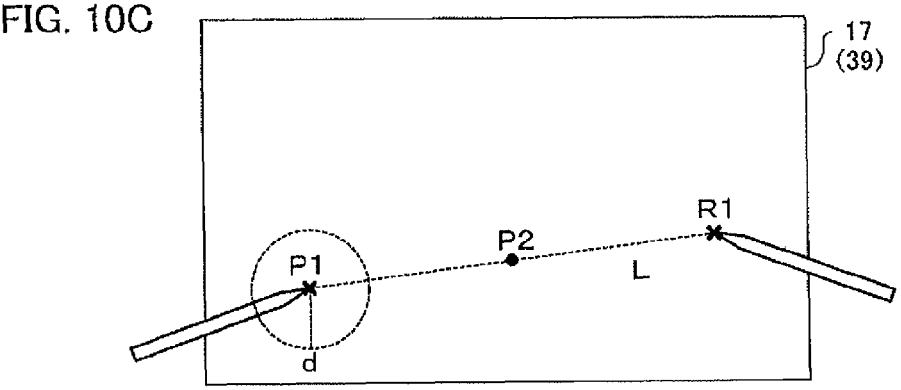
Figure 10D:
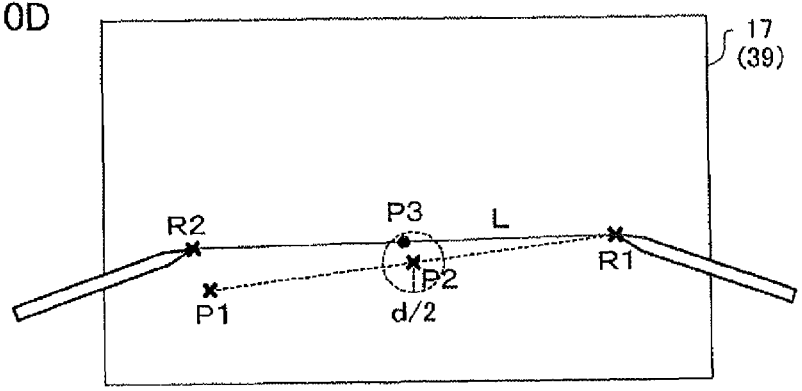

The above embodiments have been described taking an example in which it is determined that the touch position has moved from R1 (see FIG. 3D) in a state in which the tip of the right touch pen 41 comes in contact with the operation surface 39 while the touch position of the tip of the left touch pen 41 is maintained at the point P1 when the midpoint has moved from the point P2 to the point P3 in the second operation state, and the coordinates of the point R2 considered to be the touch position of the right touch pen 41 are calculated. Note that it may be determined that the touch position has moved from R1 in a state in which the tip of the left touch pen 41 comes in contact with the operation surface 39 while the touch position of the tip of the right touch pen 41 is maintained at the point R1 when the midpoint has moved from the point P2 to the point P3 in the second operation state, and the coordinates of the point R2 considered to be the touch position of the left touch pen 41 may be calculated, as illustrated in FIG. 10D.

Specifically, the correction section 108 may calculate the corrected coordinates when new detected coordinates have been acquired in the second operation state, one endpoint being indicated by the corrected coordinates initially calculated in the second operation state, a midpoint being indicated by the detected coordinates currently acquired in the second operation state, and the other endpoint being indicated by the corrected coordinates. According to this configuration, when the player performs the hold operation at the point P1 in the left area of the first display screen 17, performs the hold operation at the point R1 in the right area, and then performs the slide operation from the point P1, for example, the coordinates of the point R2 (i.e., the touch position of the slide operation) are calculated as the corrected coordinates.

5-4. Fourth Modification

The above embodiments have been described taking an example executing a soccer PK game. Note that the above method may also be applied to a ball sport game other than a soccer game, such as a baseball game or a golf game, and may also be applied to a sport game other than a ball sport game, such as a ski game or a swim game.

Figure 11A:
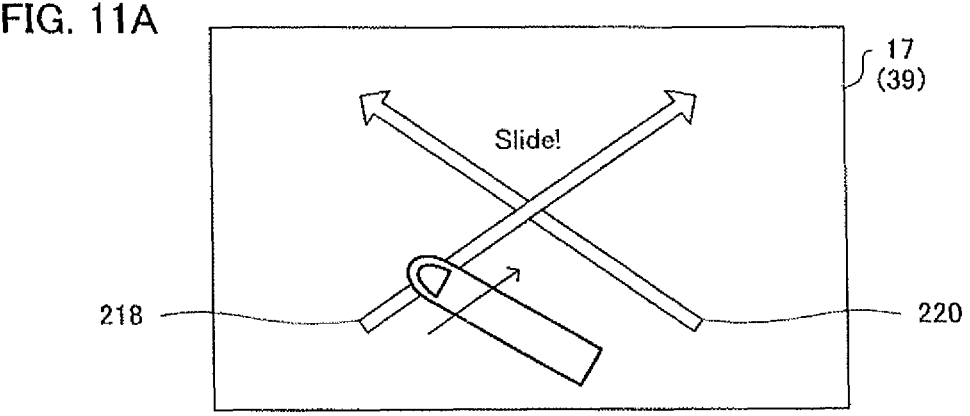
FIGS. 11A to 11C are diagrams illustrating an example of an image displayed on a game system according to one embodiment of the invention.
Figure 11B:
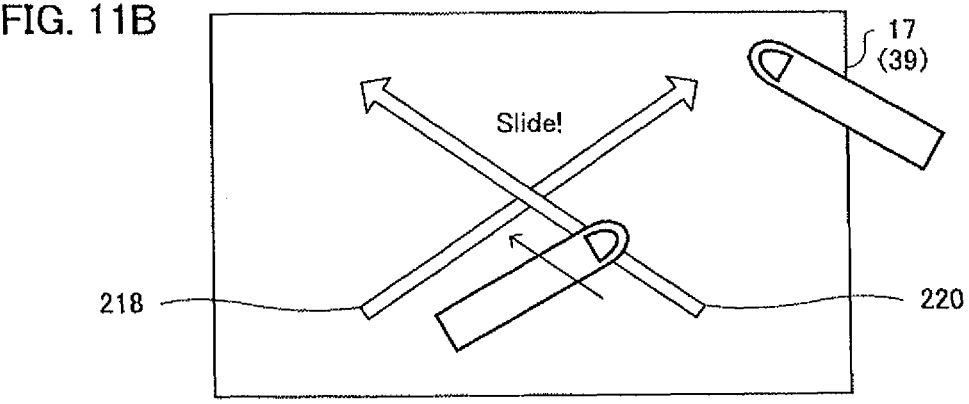
Figure 11C:
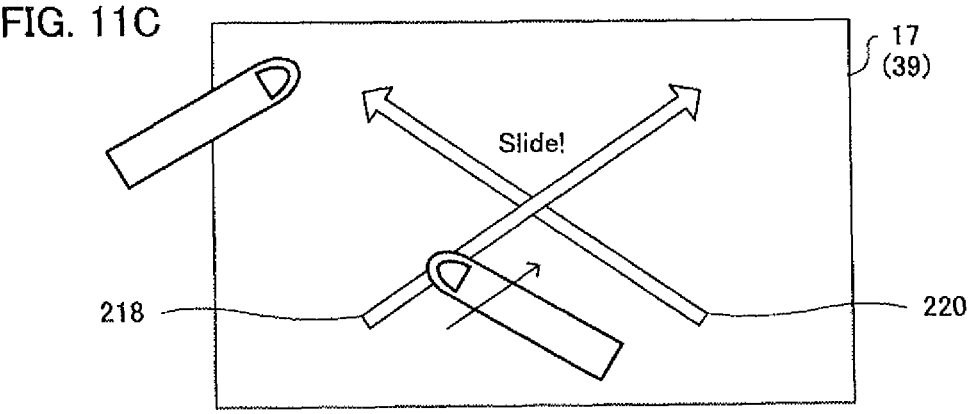

FIGS. 11A to 11C are diagrams illustrating an example in which the game system 10 executes a swim game. As illustrated in FIGS. 11A to 11C, a right arrow object 218 (i.e., first area) that extends from lower left to upper right, and a left arrow object 220 (i.e., second area) that extends from lower right to upper left are displayed on the first display screen 17 that also serves as the operation surface 39 so that the right arrow object 218 and the left arrow object 220 intersect at the center, and the player is instructed ("Slide!") to alternately perform the slide operation along the right arrow object 218 and the slide operation along the left arrow object 220. An image in which the player character swims is displayed on the second display screen 33 (not illustrated). The moving speed and the moving direction of the player character are determined based on the timing, the speed, the moving path, and the balance of the slide operation performed along the right arrow object 218 and the slide operation performed along the left arrow object 220.

As illustrated in FIG. 11A, when the player has performed the slide operation by moving the tip of an arbitrary finger of the right hand from lower left to upper right along the right arrow object 218, the movement of the touch position coincides with the movement of the detected coordinates since the operation state is the first operation state. In this case, the movement information about the player character is determined based on the moving speed and the moving path of the detected coordinates without calculating the corrected coordinates.

As illustrated in FIG. 11B, when the player has performed the slide operation by moving the tip of an arbitrary finger of the left hand from lower right to upper left along the left arrow object 220 while performing the hold operation at the upper right position on the operation surface 39 with the finger of the right hand after performing the slide operation by moving the tip of the finger of the right hand along the right arrow object 218, the movement of the touch position does not coincide with the movement of the detected coordinates since the operation state is the second operation state. In this case, the corrected coordinates are calculated based on the touch position and the detected coordinates of the hold operation performed at the upper right position on the operation surface 39, and the movement information about the player character is determined based on the moving speed and the moving path of the corrected coordinates.

As illustrated in FIG. 11C, when the player has performed the slide operation by moving the tip of an arbitrary finger of the right hand from lower left to upper right along the right arrow object 218 while performing the hold operation at the upper left position on the operation surface 39 with the finger of the left hand after performing the slide operation by moving the tip of the finger of the left hand along the left arrow object 220, the movement of the touch position does not coincide with the movement of the detected coordinates since the operation state is the second operation state. In this case, the corrected coordinates are calculated based on the upper left position on the operation surface 39 and the detected coordinates, and the movement information about the player character is determined based on the moving speed and the moving path of the corrected coordinates.

5-5. Fifth Modification

The above embodiments have been described taking an example in which the movement of the moving object displayed on the second display screen 33 is controlled based on the detected coordinates, the detected movement information, the corrected coordinates, and the corrected movement information based on the detection value from the touch panel 40. Note that the movement of the moving object displayed on the first display screen 17 (i.e., overlapping area) that also serves as the operation surface 39 of the touch panel 40 may be controlled based on the detected coordinates, the detected movement information, the corrected coordinates, and the corrected movement information.

FIGS. 12A to 12E are diagrams illustrating an example a game executed by the game system 10. As illustrated in FIGS. 12A to 12E, a plurality of sheep characters 222 and a wolf character 224 that attacks the sheep characters 222 are displayed on the first display screen 17 (operation surface 39). The sheep characters 222 escape from the wolf character 224, and the wolf character 224 runs after the sheep characters 222. As illustrated in FIG. 12A, when the player has performed the hold operation at the position at which the wolf character 224 is displayed, the movement of the wolf character 224 is stopped. As illustrated in FIG. 12B, when the player has performed the slide operation at the position at which the sheep character 222 is displayed, the sheep character 222 is moved to a safe place.

As illustrated in FIG. 12A, when the player has performed the hold operation at the position at which the wolf character 224 is displayed, the coordinates of the touch position coincide with the detected coordinates since the operation state is the first operation state. In this case, whether or not the position of the detected coordinates coincides with the display position (i.e., given position) of the wolf character 224 is determined without calculating the corrected coordinates. The movement of the wolf character 224 is stopped when the position of the detected coordinates coincides with the display position of the wolf character 224.

As illustrated in FIG. 12B, when the player has performed the slide operation at the position at which the sheep character 222 is displayed, the coordinates of the touch position coincide with the detected coordinates since the operation state is the first operation state. In this case, whether or not the moving path of the detected coordinates intersects (i.e., coincides with) the display position (i.e., given position) of the sheep character 222 is determined without calculating the corrected coordinates. The sheep character 222 is moved to a safe place when the moving path of the detected coordinates intersects the display position of the sheep character 222.

As illustrated in FIG. 12C, when the player has performed the slide operation (i.e., second touch operation) at the position at which the sheep character 222 is displayed while performing the hold operation at the position at which the wolf character 224 is displayed, the coordinates of the touch position do not coincide with the detected coordinates since the operation state is the second operation state. In this case, the corrected coordinates are calculated based on the detected coordinates and the touch position of the hold operation on the wolf character 224, whether or not the moving path of the corrected coordinates intersects (i.e., coincides with) the display position (i.e., given position) of the sheep character 222 is determined. The sheep character 222 is moved to a safe place when the moving path of the corrected coordinates intersects the display position of the sheep character 222.

As illustrated in FIG. 12D, when the player has performed the hold operation (i.e., first touch operation) at the position at which the wolf character 224 is displayed under given conditions, the movement of the wolf character 224 may be stopped. When the player has performed the hold operation (i.e., second touch operation) at the position at which the sheep character 222 is displayed while performing the hold operation at the position at which the wolf character 224 is displayed, the movement of the sheep character 222 may be stopped. In FIG. 12D, since the operation state is the second operation state, the coordinates of the touch position do not coincide with the detected coordinates. In this case, the corrected coordinates are calculated based on the detected coordinates and the touch position of the hold operation performed at the position at which the wolf character 224 is displayed, and whether or not the corrected coordinates coincide with the coordinates of the display position (i.e., given position) of the sheep character 222 is determined. The movement of the sheep character 222 may be stopped when the corrected coordinates coincide with the coordinates of the display position of the sheep character 222. When the player has performed the slide operation from the position at which the player has performed the hold operation on the wolf character 224, the touch position of the slide operation may be calculated as the corrected coordinates, and the wolf character 224 may be moved to follow the slide operation based on the corrected coordinates (see FIG. 10D).

5-6. Sixth Modification

The above embodiments have been described taking an example in which the movement of the moving object is controlled based on the detected coordinates, the detected movement information, the corrected coordinates, and the corrected movement information based on the detection value from the touch panel 40. Note that a character or a picture may be drawn corresponding to the moving path of the touch operation based on the detected coordinates, the detected movement information, the corrected coordinates, and the corrected movement information.

Figure 13:
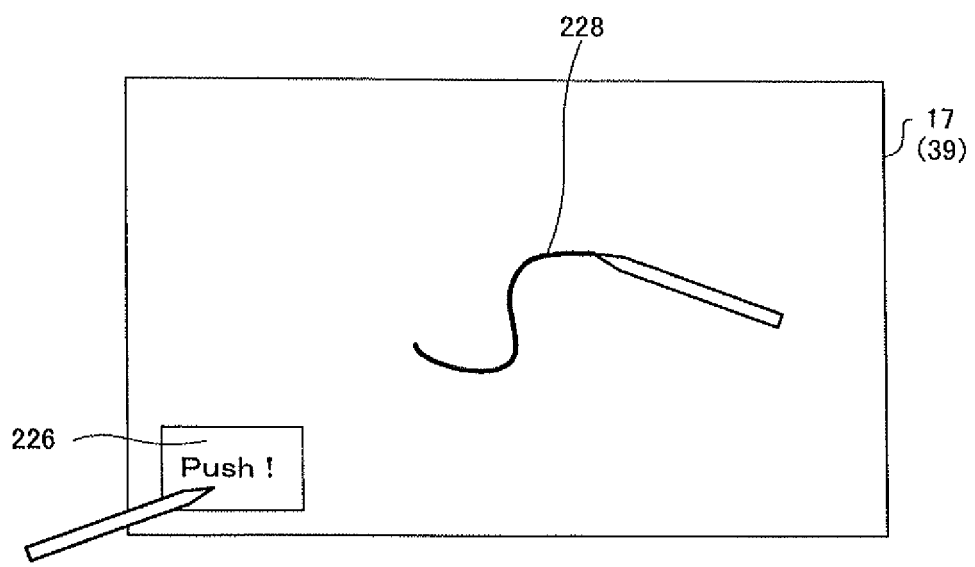
FIG. 13 is a diagram illustrating an example of an image displayed on a game system according to one embodiment of the invention.

As illustrated in FIG. 13, when the player has drawn a curve (i.e., second touch operation) on the operation surface 39 using the right touch pen 41 while performing the hold operation (i.e., first touch operation) using the left touch pen 41 at the lower left position of the first display screen 17 at which a button 226 (i.e., first area) is displayed, the coordinates of the touch position do not coincide with the detected coordinates since the operation state is the second operation state. In this case, the corrected coordinates are calculated based on the detected coordinates and the touch position of the hold operation performed on the button 226, and a curve 228 is drawn along the moving path of the corrected coordinates.

5-7. Seventh Modification

The above embodiments have been described taking an example in which an image is controlled based on the detected coordinates, the detected movement information, the corrected coordinates, and the corrected movement information based on the detection value from the touch panel 40. Note that coincidence with a given position may be determined based on the detected coordinates, the detected movement information, the corrected coordinates, and the corrected movement information, and sound may be controlled, or the game calculations may be performed.

Figure 14:
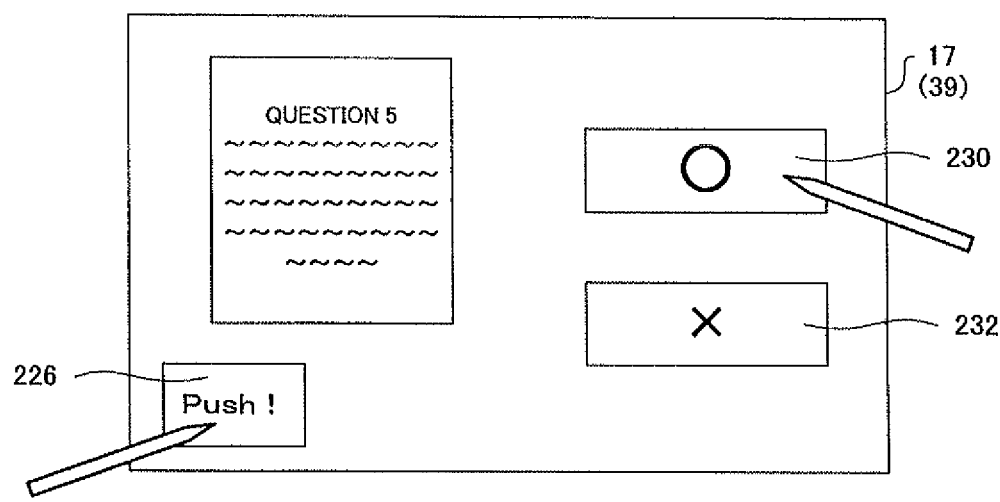
FIG. 14 is a diagram illustrating an example of an image displayed on a game system according to one embodiment of the invention.

As illustrated in FIG. 14, a quiz may be displayed when the player performs the hold operation (i.e., first touch operation) using the left touch pen 41 at the lower left position of the first display screen 17 at which the button 226 (i.e., first area) is displayed, and the player may perform an answer operation by performing a touch operation on a circular button display 230 (i.e., second area) displayed at the upper right position of the first display screen 17 or a cross-shaped button display 232 (i.e., second area) displayed at the lower right position of the first display screen 17. Whether or not the touch position of the touch operation coincides with the display position of the button corresponding to the correct answer may be determined, and a process (e.g., outputs sound that indicate a correct answer, or adds points) other than the display control process may be performed when the touch position of the touch Operation coincides with the display position of the button corresponding to the correct answer.

As illustrated in FIG. 14, when the player has performed the touch operation on the circular button display 230 or the cross-shaped button display 232 using the right touch pen 41 while performing the hold operation at the display position of the button 226 using the left touch pen 41, the coordinates of the touch position do not coincide with the detected coordinates since the operation state is the second operation state. In this case, the corrected coordinates are calculated based on the detected coordinates and the touch position of the hold operation performed on the button 226. Whether or not the corrected coordinates coincide with the coordinates of the display position of the circular button display 230 or the cross-shaped button display 232 is determined.

5-8. Eighth Modification

Whether or not the moving path of the detected coordinates in the second operation state coincides with a given moving path may be determined. For example, an equilateral triangle and a square having an identical side length may be displayed on the first display screen 17, and data that indicates the moving path of the midpoint when the player traces each side of the equilateral triangle with the tip of an arbitrary finger of the left hand, and traces each side of the square with the tip of an arbitrary finger of the right hand may be provided in advance. Whether or not the moving path of the detected coordinates in the second operation state coincides with such a moving path may be determined. In this case, the equilateral triangle and the square may be displayed side by side on the first display screen 17 to guide the player. The moving path may have a given width taking account of a difference in movement of the fingers.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A program stored in a non-transitory computer-readable information storage medium, the program controlling an image displayed on a display screen of a display section based on a detection value output from a detection section, the detection section outputting the detection value corresponding to a first position when an operation state of a touch operation performed on an operation surface is a first operation state in which a first touch operation is performed at the first position on the operation surface, and outputting the detection value corresponding to a midpoint between the first position and a second position when the operation state is a second operation state in which a second touch operation is performed at the second position on the operation surface in addition to the first touch operation, the program causing a computer to function as:
    an acquisition section that acquires a detected position based on the detection value, the detected position indicating a position on the operation surface;
    a state determination section that determines whether the operation state is the first operation state or the second operation state based on the detection value;
    a correction section that calculates a corrected position when the operation state is the second operation state, one endpoint being indicated by the detected position acquired in the first operation state, a midpoint being indicated by the detected position acquired in the second operation state, and the other endpoint being indicated by the corrected position; and
    a display control section that controls the image based on the corrected position,
    wherein (1) the operation surface comprises a first area and a second area which is separate from the first area, the display screen comprises a third area which is separate from the first area and the second area, (2) the image includes a first object and a second object that is different from the first object, (3) the display control section (a) controls movement of the first object in response to the first position when the operation state is the first operation state, and (b) controls the movement of the second object in response to both the first position and the corrected position when the operation state is the second operation state, (4)the first touch operation is performed in the first area, the second touch operation is performed on the second area, and the image is displayed on the third area, (5) for the second operation state. movement of the first object and the second object is controlled by simultaneous preformed first and second touch operations, solely via the corrected position calculated by the correction section that uses the midpoint indicated by the detected position acquired in the second operation state.

2. The program as defined in claim 1,
    wherein the correction section calculates the corrected position when a new detected position has been acquired in the second operation state, one endpoint being indicated by the detected position acquired in the first operation state, a midpoint being indicated by the detected position currently acquired in the second operation state, and the other endpoint being indicated by the corrected position.

3. The program as defined in claim 1,
    wherein the correction section calculates the corrected position when a new detected position has been acquired in the second operation state, one endpoint being indicated by the corrected position initially calculated in the second operation state, a midpoint being indicated by the detected position currently acquired in the second operation state, and the other endpoint being indicated by the corrected position.

4. The program as defined in claim 1,
    wherein the program causes the computer to further function as a movement information calculation section that calculates movement information about the corrected position when the corrected position has changed; and
    wherein the display control section controls the image based on the movement information about the corrected position.

5. The program as defined in claim 1,
    wherein the program causes the computer to further function as a period measurement section that measures a period of the first operation state; and
    wherein the display control section controls the image based on the period of the first operation state.

6. The program as defined in claim 1, wherein the display control section displays a display object in an overlapping area of the display screen that overlaps the operation surface, the display object dividing the operation surface into the first area, and the second area.

7. The program as defined in claim 1,
    wherein the state determination section determines that the operation state is a non-operation state in which the touch operation is not performed on the operation surface when the detection value is not output, determines that the operation state is the first operation state when the detection value has been output when the operation state is the non-operation state, and determines that the operation state is the second operation state when a moving amount of the detected position has exceeded a first threshold value when the operation state is the first operation state.

8. The program as defined in claim 1,
    wherein the state determination section determines that the operation state is the first operation state when a moving amount of the detected position has exceeded a second threshold value when the operation state is the second operation state.

9. A non-transitory computer-readable information storage medium for storing the program as defined in claim 1.

10. A program stored in a non-transitory computer-readable information storage medium, the program controlling an image displayed on a display screen of a display section based on a detection value output from a detection section, the detection section outputting the detection value corresponding to a first position when an operation state of a touch operation performed on an operation surface is a first operation state in which a first touch operation is performed at the first position on the operation surface, and outputting the detection value corresponding to a midpoint between the first position and a second position when the operation state is a second operation state in which a second touch operation is performed at the second position on the operation surface in addition to the first touch operation, the program causing a computer to function as:

an acquisition section that acquires a detected position based on the detection value, the detected position indicating a position on the operation surface;

a state determination section that determines whether the operation state is the first operation state or the second operation state based on the detection value;

a correction section that calculates a corrected position when the operation state is the second operation state, one endpoint being indicated by the detected position in the first operation state, a midpoint being indicated by the detected position in the second operation state, and the other endpoint being indicated by the corrected position;

a position determination section that determines whether or not the corrected position coincides with a given position; and a display control section that controls the image, wherein (1) the operation surface comprises a first area and a second area which is separate from the first area, the display screen comprises a third area which is separate from the first area and the second area, (2) the image includes a first object and a second object that is different from the first object, (3) the display control section (a) controls movement of the first object in response to the first position when the operation state is the first operation state, and (b) controls the movement of the second object in response to both the first position and the corrected position when the operation state is the second operation state, (4) the first touch operation is performed in the first area, the second touch operation is performed on the second area, and the image is displayed on the third area, (5) for the second operation state, movement of the first object and the second object is controlled by simultaneously performed first and second touch operations, solely via the corrected position calculated by the correction section that uses the midpoint indicated by the detected position acquired in the second operation state.

11. The program as defined in claim 10, wherein the correction section calculates the corrected position when a new detected position has been acquired in the second operation state, one endpoint being indicated by the detected position acquired in the first operation state, a midpoint being indicated by the detected position currently acquired in the second operation state, and the other endpoint being indicated by the corrected position.

12. The program as defined in claim 10, wherein the correction section calculates the corrected position when a new detected position has been acquired in the second operation state, one endpoint being indicated by the corrected position initially calculated in the second operation state, a midpoint being indicated by the detected position currently acquired in the second operation state, and the other endpoint being indicated by the corrected position.

13. The program as defined in claim 10, wherein the program causes the computer to further function as a movement information calculation section that calculates movement information about the corrected position when the corrected position has changed; and wherein the display control section controls the image based on the movement information about the corrected position.

14. The program as defined in claim 10, wherein the program causes the computer to further function as a period measurement section that measures a period of the first operation state; and wherein the display control section controls the image based on the period of the first operation state.

15. The program as defined in claim 10, wherein the display control section displays a display object in an overlapping area of the display screen that overlaps the operation surface, the display object dividing the operation surface into the first area, and the second area.

16. The program as defined in claim 10, wherein the state determination section determines that the operation state is a non-operation state in which the touch operation is not performed on the operation surface when the detection value is not output, determines that the operation state is the first operation state when the detection value has been output when the operation state is the non-operation state, and determines that the operation state is the second operation state when a moving amount of the detected position has exceeded a first threshold value when the operation state is the first operation state.

17. The program as defined in claim 10, wherein the state determination section determines that the operation state is the first operation state when a moving amount of the detected position has exceeded a second threshold value when the operation state is the second operation state.

18. A non-transitory computer-readable information storage medium for storing the program as defined in claim 10.

19. The program as defined in claim 10, wherein the display control section controls the image based on a determination result of the position determination section.

20. The program as defined in claim 19, wherein the correction section calculates the corrected position when a new detected position has been acquired in the second operation state, one endpoint being indicated by the detected position acquired in the first operation state, a midpoint being indicated by the detected position currently acquired in the second operation state, and the other endpoint being indicated by the corrected position.

21. An image control system that controls an image displayed on a display screen of a display section based on a detection value output from a detection section, the detection section outputting the detection value corresponding to a first position when an operation state of a touch operation performed on an operation surface is a first operation state in which a first touch operation is performed at the first position on the operation surface, and outputting the detection value corresponding to a midpoint between the first position and a second position when the operation state is a second operation state in which a second touch operation is performed at the second position on the operation surface in addition to the first touch operation, the image control system comprising:
- an acquisition section that acquires a detected position based on the detection value, the detected position indicating a position on the operation surface;
- a state determination section that determines whether the operation state is the first operation state or the second operation state based on the detection value;
- a correction section that calculates a corrected position when the operation state is the second operation state, one endpoint being indicated by the detected position acquired in the first operation state, a midpoint being indicated by the detected position acquired in the second operation state, and the other endpoint being indicated by the corrected position; and
- a display control section that controls the image based on the corrected position,
- wherein (1) the operation surface comprises a first area and a second area which is separate from the first area, the display screen comprises a third area which is separate from the first area and the second area, (2) the image includes a first object and a second object that is different from the first object, (3) the display control section (a) controls movement of the first object in response to the first position when the operation state is the first operation state, and (b) controls the movement of the second object in response to both the first position and the corrected position when the operation state is the second operation state, (4) the first touch operation is performed in the first area, the second touch operation is performed on the second area, and the image is displayed on the third area, (5) for the second operation state, movement of the first object and the second object is controlled by simultaneously performed first and second touch operations, solely via the corrected position calculated by the correction section that uses the midpoint indicated by the detected position acquired in the second operation state.

22. An image control system that controls an image displayed on a display screen of a display section based on a detection value output from a detection section, the detection section outputting the detection value corresponding to a first position when an operation state of a touch operation performed on an operation surface is a first operation state in which a first touch operation is performed at the first position on the operation surface, and outputting the detection value corresponding to a midpoint between the first position and a second position when the operation state is a second operation state in which a second touch operation is performed at the second position on the operation surface in addition to the first touch operation, the image control system comprising:
- an acquisition section that acquires a detected position based on the detection value, the detected position indicating a position on the operation surface;
- a state determination section that determines whether the operation state is the first operation state or the second operation state based on the detection value;
- a correction section that calculates a corrected position when the operation state is the second operation state, one endpoint being indicated by the detected position in the first operation state, a midpoint being indicated by the detected position in the second operation state, and the other endpoint being indicated by the corrected position;
- a position determination section that determines whether or not the corrected position coincides with a given position; and
- a display control section that controls the image,
- wherein (1) the operation surface comprises a first area and a second area which is separate from the first area, the display screen comprises a third area which is separate from the first area and the second area, (2) the image includes a first object and a second object that is different from the first object, (3) the display control section (a) controls movement of the first object in response to the first position when the operation state is the first operation state, and (b) controls the movement of the second object in response to both the first position and the corrected position when the operation state is the second operation state, (4) the first touch operation is performed in the first area, the second touch operation is performed on the second area, and the image is displayed on the third area, (5) for the second operation state, movement of the first object and the second object is controlled by simultaneously performed first and second touch operations, solely via the corrected position calculated by the correction section that uses the midpoint indicated by the detected position acquired in the second operation state.

23. A program stored in a non-transitory computer-readable information storage medium, the program controlling an image displayed on a display screen of a display section based on a detection value output from a detection section, the detection section outputting the detection value corresponding to a first position when an operation state of a touch operation performed on an operation surface is a first operation state in which a first touch operation is performed at the first position on the operation surface, and outputting the detection value corresponding to a midpoint between the first position and a second position when the operation state is a second operation state in which a second touch operation is performed at the second position on the operation surface in addition to the first touch operation, the program causing a computer to function as:
- an acquisition section that acquires a detected position based on the detection value, the detected position indicating a position on the operation surface;
- a state determination section that determines whether the operation state is the first operation state or the second operation state based on the detection value;
- a correction section that calculates a corrected position when the operation state is the second operation state, one endpoint being indicated by the detected position acquired in the first operation state, a midpoint being indicated by the detected position acquired in the second operation state, and the other endpoint being indicated by the corrected position; and
- a display control section that controls the image based on the corrected position,
- wherein (1) the image includes a first object and a second object that is different from the first object; (2) the display control section (a) controls movement of the first object in response to the first position when the operation state is the first operation state, and (b) controls movement of the second object in response to the corrected position when the operation state is the second operation state; (3) the first touch operation is performed on a first area of the operation surface. the second touch operation is performed on a second area of the operation surface different from the first area, and the image is displayed by the display control section; (4) for the second operation state, movement of the first object and the second object is controlled by simultaneously performed first and second touch operations, solely via the corrected position calculated by the correction section that uses the midpoint indicated by the detected position acquired in the second operation state.

24. A program, stored in a non-transitory computer-readable information storage medium, the program controlling an image displayed on a display screen of a display section based on a detection value output from a detection section, the detection section outputting the detection value corresponding to a first position when an operation state of a touch operation performed on an operation surface is a first operation state in which a first touch operation is performed at the first position on the operation surface, and outputting the detection value corresponding to a midpoint between the first position and a second position when the operation state is a second operation state in which a second touch operation is performed at the second position on the operation surface in addition to the first touch operation, the program causing a computer to function as:
  an acquisition section that acquires a detected position based on the detection value, the detected position indicating a position on the operation surface;
  a state determination section that determines whether the operation state is the first operation state or the second operation state based on the detection value;
  a correction section that calculates a corrected position when the operation state is the second operation state, one endpoint being indicated by the detected position in the first operation state, a midpoint being indicated by the detected position in the second operation state, and the other endpoint being indicated by the corrected position;
  a position determination section that determines whether or not the corrected position coincides with a given position; and
  a display control section that controls the image,
  wherein (1) the image includes a first object and a second object that is different from the first object; (2) the display control section (a) controls movement of the first object in response to the first position when the operation state is the first operation state, and (b) controls movement of the second object in response to the corrected position when the operation state is the second operation state; (3) the first touch operation is performed on a first area of the operation surface, the second touch operation is performed on a second area of the operation surface different from the first area, and the image is displayed by the display control section (4) for the second operation state, movement of the first object and the second object is controlled by simultaneously performed first and second touch operations, solely via the corrected position calculated by the correction section that uses the midpoint indicated by the detected position acquired in the second operation state.

25. An image control system that controls an image displayed on a display screen of a display section based on a detection value output from a detection section, the detection section outputting the detection value corresponding to a first position when an operation state of a touch operation performed on an operation surface is a first operation state in which a first touch operation is performed at the first position on the operation surface, and outputting the detection value corresponding to a midpoint between the first position and a second position when the operation state is a second operation state in which a second touch operation is performed at the second position on the operation surface in addition to the first touch operation, the image control system comprising:
  an acquisition section that acquires a detected position based on the detection value, the detected position indicating a position on the operation surface
  a state determination section that determines whether the operation state is the first operation state or the second operation state based on the detection value;
  a correction section that calculates a corrected position when the operation state is the second operation state, one endpoint being indicated by the detected position acquired in the first operation state, a midpoint being indicated by the detected position acquired in the second operation state, and the other endpoint being indicated by the corrected position; and
  a display control section that controls the image based on the corrected position,
  wherein (1) the image includes a first object and a second object that is different from the first object; (2) the display control section (a) controls movement of the first object in response to the first position when the operation state is the first operation state, and (b) controls movement of the second object in response to the corrected position when the operation state is the second operation state; (3) the first touch operation is performed on a first area of the operation surface, the second touch operation is performed on a second area of the operation surface different from the first area. and the image is displayed by the display control sec on, (4) for the second operation state, movement of the first object and the second object is controlled by simultaneously performed first and second touch operations solely via the corrected position calculated by the correction section that uses the midpoint indicated by the detected position acquired in the second operation state.

26. An image control system that controls an image displayed on a display screen of a display section based on a detection value output from a detection section, the detection section outputting the detection value corresponding to a first position when an operation state of a touch operation performed on an operation surface is a first operation state in which a first touch operation is performed at the first position on the operation surface, and outputting the detection value corresponding to a midpoint between the first position and a second position when the operation state is a second operation state in which a second touch operation is performed at the second position on the operation surface in addition to the first touch operation, the image control system comprising:
  an acquisition section that acquires a detected position based on the detection value, the detected position indicating a position on the operation surface;
  a state determination section that determines whether the operation state is the first operation state or the second operation state based on the detection value;
  a correction section that calculates a corrected position when the operation state is the second operation state, one endpoint being indicated by the detected position in the first operation state, a midpoint being indicated by the detected position in the second operation state, and the other endpoint being indicated by the corrected position;
  a position determination section that determines whether or not the corrected position coincides with a given position; and
  a display control section that controls the image,
  wherein (1) the image includes a first object and a second object that is different from the first object; (2) the display control section (a) controls movement of the first object in response to the first position when the operation state is the first operation state, and (b) controls movement of the second object in response to the corrected position when the operation state is the second operation state (3) the first touch operation is performed on a first area of the operation surface, the second touch operation is performed on a second area of the operation surface different from the first area, and the image is displayed by the display control section, (4) for the second operation state, movement of the first object and the second object is controlled by simultaneously performed first and second touch operations. solely via the corrected position calculated by the correction section that uses the midpoint indicated by the detected position acquired in the second operation state.

* * * * *